(12) United States Patent
Chen et al.

(10) Patent No.: US 12,296,648 B2
(45) Date of Patent: May 13, 2025

(54) THERMAL MANAGEMENT SYSTEM AND NEW ENERGY VEHICLE

(71) Applicant: HUAWEI DIGITAL POWER TECHNOLOGIES CO., LTD., Shenzhen (CN)

(72) Inventors: Jun Chen, Dongguan (CN); Chaopeng Liu, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 288 days.

(21) Appl. No.: 17/894,902

(22) Filed: Aug. 24, 2022

(65) Prior Publication Data

US 2022/0402332 A1     Dec. 22, 2022

Related U.S. Application Data

(63) Continuation of application No. PCT/CN2020/118379, filed on Sep. 28, 2020.

(30) Foreign Application Priority Data

Feb. 28, 2020    (CN) .......................... 202010129024.2

(51) Int. Cl.
    *B60H 1/00*         (2006.01)
    *B60L 58/26*       (2019.01)
    (Continued)

(52) U.S. Cl.
    CPC ..... *B60H 1/00885* (2013.01); *B60H 1/00278* (2013.01); *B60L 58/26* (2019.02);
    (Continued)

(58) Field of Classification Search
    CPC ............ B60H 1/00885; B60H 1/00278; B60H 1/3228–1/32284; B60H 2001/00307;
    (Continued)

(56) References Cited

U.S. PATENT DOCUMENTS 9,731,578 B2    8/2017   Johnston
9,879,891 B2    1/2018   Kowsky et al.
(Continued)

FOREIGN PATENT DOCUMENTS

CN         1225941 A    8/1999
CN      102452297 A    5/2012
(Continued)

OTHER PUBLICATIONS

Machine English Language translation of CN 108725138 to Yu. Translated Aug. 2024 (Year: 2018).*

(Continued)

*Primary Examiner* — Cassey D Bauer
(74) *Attorney, Agent, or Firm* — Fish & Richardson P.C.

(57) ABSTRACT

Disclosed are a thermal management system and a new energy vehicle. The new energy vehicle includes an electric motor and a thermal management system. The thermal management system includes a refrigeration cycle system, a flow path pump, a first thermal management object, a second thermal management object, and a plurality of three-way valves. The refrigeration cycle system and the flow path pump are separately connected to the plurality of three-way valves. The refrigeration cycle system and the flow path pump are connected to the first thermal management object and the second thermal management object through the plurality of three-way valves respectively. The plurality of three-way valves are separately controlled, to form a first coolant circulation loop and a second coolant circulation loop that are independent of each other, and separately control temperatures of the first thermal management object and the second thermal management object.

20 Claims, 14 Drawing Sheets

(51) Int. Cl.
*H01M 10/613* (2014.01)
*H01M 10/625* (2014.01)
*H01M 10/6568* (2014.01)
*H01M 10/663* (2014.01)

(52) U.S. Cl.
CPC ....... *H01M 10/613* (2015.04); *H01M 10/625* (2015.04); *H01M 10/6568* (2015.04); *H01M 10/663* (2015.04); *B60H 2001/00307* (2013.01); *B60L 2240/545* (2013.01); *H01M 2220/20* (2013.01)

(58) Field of Classification Search
CPC ............. H01M 10/613; H01M 10/625; H01M 10/6568; H01M 10/663; H01M 2220/20; B60L 58/26; B60L 2240/545
See application file for complete search history.

(56) References Cited

U.S. PATENT DOCUMENTS

| | | | |
|---|---|---|---|
| 10,259,291 | B2 | 4/2019 | Aldridge |
| 2009/0293525 | A1 | 12/2009 | Monforte |
| 2018/0106510 | A1* | 4/2018 | Brown ................. F25B 49/02 |
| 2018/0281562 | A1* | 10/2018 | Spies ................. F25B 25/005 |
| 2019/0047352 | A1 | 2/2019 | Kim |
| 2019/0061470 | A1 | 2/2019 | Koberstein et al. |
| 2020/0047626 | A1 | 2/2020 | Szkrybalo et al. |

FOREIGN PATENT DOCUMENTS

| | | | |
|---|---|---|---|
| CN | 204532518 U | 8/2015 | |
| CN | 106337720 A | 1/2017 | |
| CN | 107639992 A | 1/2018 | |
| CN | 108284725 A | 7/2018 | |
| CN | 108725138 A * | 11/2018 | ......... B60H 1/00007 |
| CN | 109641507 A | 4/2019 | |
| CN | 109983287 A | 7/2019 | |
| CN | 110311190 A | 10/2019 | |
| CN | 110626146 A | 12/2019 | |
| CN | 111319514 A | 6/2020 | |
| EP | 1302731 A1 | 4/2003 | |
| IN | 208682661 U | 4/2019 | |

OTHER PUBLICATIONS

Office Action in Chinese Appln. No. 202010129024.2, dated Jan. 11, 2021, 14 pages (with English translation).

Office Action in Chinese Appln. No. 202010129024.2, dated Aug. 2, 2021, 16 pages (with English translation).

Office Action in Chinese Appln. No. 202010129024.2, dated Nov. 22, 2021, 16 pages (with English translation).

International Search Report and Written Opinion in International Appln. No. PCT/CN2020/118379, mailed on Dec. 30, 2020, 19 pages (with English translation).

Extended European Search Report in European Appln No. 20922343.7, dated Jul. 20, 2023, 7 pages.

* cited by examiner

THERMAL MANAGEMENT SYSTEM AND NEW ENERGY VEHICLE

CROSS-REFERENCE TO RELATED APPLICATIONS

This application is a continuation of International Application No. PCT/CN2020/118379, filed on Sep. 28, 2020, which claims priority to Chinese Patent Application No. 202010129024.2, filed on Feb. 28, 2020. The disclosures of the aforementioned applications are hereby incorporated by reference in their entireties.

TECHNICAL FIELD

This application relates to the field of thermal management, and in particular, to a thermal management system and a new energy vehicle.

BACKGROUND

An electric vehicle is mainly powered by a battery. Compared with fuel for a conventional vehicle, the battery has features such as energy conservation and environmental protection. Generally, the battery has an optimal operating temperature range of 20° C. to 45° C. An excessively high or excessively low temperature adversely affects performance and a service life of the battery. Therefore, in an actual application scenario, thermal management needs to be performed on the battery.

Currently, the thermal management of the battery is mainly implemented through indirect heat exchange. The indirect heat exchange refers to a heat exchange manner in which heat exchange media do not come into direct contact with each other, and is a heat exchange manner with low production costs and high production efficiency in terms of time and process. A temperature of a coolant is adjusted by using a refrigeration cycle system, and then the coolant with the temperature adjusted is conveyed to the battery through a pipe, to adjust a temperature of the battery. In addition to the battery, the electric battery includes other thermal management objects, such as a cabin.

Currently, the plurality of thermal management objects may be connected in series. In a series connection, because a coolant changes the temperature after flowing through a first thermal management object, the coolant with the temperature having been changed is uncontrollable in temperature when flowing to a next thermal management object, and temperature control of the second heat management object cannot be ensured.

SUMMARY

Embodiments of this application provide a thermal management system and a new energy vehicle, to connect different thermal management objects in parallel and separately adjust temperatures.

To resolve the foregoing technical problem, embodiments of this application provide the following technical solutions.

A first aspect of this application provides a thermal management system, including a refrigeration cycle system, a flow path pump, a first heat management object, a second heat management object, and a plurality of three-way valves. The refrigeration cycle system and the flow path pump are separately connected to the plurality of three-way valves. The refrigeration cycle system and the flow path pump are connected to the first thermal management object and the second thermal management object through the plurality of three-way valves respectively, to form a first coolant circulation loop and a second coolant circulation loop that are independent of each other.

The plurality of three-way valves are separately controlled to control whether the first coolant circulation loop and/or the second coolant circulation loop are/is opened or control a flow rate of a coolant entering the first coolant circulation loop and/or a flow rate of a coolant entering the second coolant circulation loop, to separately control temperatures of the first thermal management object and the second thermal management object.

In some possible implementations, the first thermal management object is a heating, ventilation and air conditioning (HVAC) system, and the second thermal management object is a battery pack. Temperatures of the first coolant circulation loop and the second coolant circulation loop are separately controlled, to meet different temperature requirements of the HVAC system and the battery pack.

In some possible implementations, the thermal management system further includes a temperature compensated pump. The temperature compensated pump is connected to a coolant output and a coolant input of the battery pack, and is configured to guide a coolant from an output part of the battery pack back into the battery pack, to implement compensation control of a cooling temperature of the battery pack and form a third coolant circulation loop from the temperature compensated pump to the battery pack. Therefore, a temperature of the coolant received by the battery pack is different from a temperature of the coolant received by the HVAC system, and temperature control of the HVAC system and battery pack based on different temperature requirements is improved.

In some possible implementations, the first coolant circulation loop and the second coolant circulation loop each include a common part of a circulation loop formed by the refrigeration cycle system, the flow path pump, and the plurality of three-way valves. The first coolant circulation loop further includes the first thermal management object, and the second coolant circulation loop further includes the second thermal management object. The plurality of three-way valves include a first three-way valve and a second three-way valve. The refrigeration cycle system is separately connected to the flow path pump and the second three-way valve, and the flow path pump is connected to the first three-way valve. Therefore, the first coolant circulation loop with the first thermal management object and the second coolant circulation loop with the second thermal management object are formed.

The flow path pump is separately connected to the first thermal management object and the second thermal management object through the first three-way valve, to allow the refrigeration cycle system, the flow path pump, the first three-way valve, the first thermal management object, and the second three-way valve to form the first coolant circulation loop. The refrigeration cycle system is separately connected to the first thermal management object and the second thermal management object through the second three-way valve, to allow the refrigeration cycle system, the flow path pump, the first three-way valve, the second thermal management object, and the second three-way valve to form the second coolant circulation loop.

In some possible implementations, the thermal management system further includes a radiator. The plurality of three-way valves further include a third three-way valve and a fourth three-way valve. The third three-way valve is connected in series between the flow path pump and the first three-way valve, the fourth three-way valve is connected in series between the flow path pump and the second three-way valve, and the radiator is separately connected to the third three-way valve and the fourth three-way valve, to allow the refrigeration cycle system, the flow path pump, the third three-way valve, the radiator, and the fourth three-way valve to form a fourth coolant circulation loop. Through the fourth coolant circulation loop, the radiator allows the refrigeration cycle system to exchange heat with an external environment, to remove redundant heat in the refrigeration cycle system.

In some possible implementations, the thermal management system further includes an expansion water tank. The expansion water tank is connected in series between the refrigeration cycle system and the second three-way valve, and is configured to accommodate a volume increase of the coolant caused by thermal expansion. This avoids a problem that when a temperature of the coolant increases, due to thermal expansion and cold contraction, a total volume of the coolant increases, and the volume increase of the coolant may cause a hydraulic pressure increase or a pipe burst.

In some possible implementations, the refrigeration cycle system includes a chiller, a condenser, and a compressor. The condenser is separately connected to the compressor and the chiller. The compressor is connected to the chiller. The compressor is configured to obtain a gas refrigerant from the chiller, and convey the gas refrigerant to the condenser. The condenser is configured to cool the gas refrigerant to convert the gas refrigerant into a liquid refrigerant and obtain heat, heat the coolant by using the obtained heat, and convey the liquid refrigerant to the chiller under pressure provided by the compressor. The chiller is configured to cool the coolant by using the liquid refrigerant, to convert the liquid refrigerant into a gas refrigerant.

It should be noted that the compressor is a driven fluid machine that compresses low-pressure gas to high-pressure gas, and may be referred to as a heart of the refrigeration cycle system. The compressor sucks in a low-temperature and low-pressure gas refrigerant, compresses the gas refrigerant by using a piston driven by a running electric motor, exhausts a high-temperature and high-pressure gas refrigerant to an exhaust pipe, to provide power for the refrigerant in the refrigerant circulation loop.

In this embodiment of this application, the condenser first cools the refrigerant. The coolant obtains heat in a cooling process, and the heat is used for heating the coolant. When the compressor operates, the condenser conveys the cooled refrigerant to the chiller through a pipe. Then, the chiller cools the coolant by using the refrigerant, and the refrigerant obtains heat from the coolant. The refrigerant is vaporized after obtaining the heat. The chiller conveys a vaporized refrigerant back to the condenser through a pipe. Then, the condenser cools the refrigerant. This cycle is repeated. In conclusion, the refrigerant carries different quantities of heat in different forms, and circulates in the chiller and the condenser, so that the chiller performs cooling and the condenser performs heating.

In some possible implementations, the refrigeration cycle system further includes a throttling mechanism and a liquid storage dryer. The throttling mechanism is connected in series between the chiller and the condenser, and is configured to control a flow rate of the liquid refrigerant from the condenser to the chiller. The liquid storage dryer is connected in series between the chiller and the compressor, and is configured to dry and filter the gas refrigerant.

In some possible implementations, the HVAC system includes a cooling core and a heating core. The cooling core is configured to receive the coolant from the chiller, and perform cooling by using the received coolant. The heating core is configured to receive the coolant from the condenser, and perform heating by using the received coolant. In this case, the HVAC system can perform both heating and cooling.

An embodiment of a second aspect of this application further provides a thermal management system. The thermal management system includes two thermal management subsystems: a cooling subsystem and a heating subsystem.

The cooling subsystem includes a chiller of a refrigeration cycle system, a first flow path pump, a cooling core of an HVAC system, a battery pack, a first temperature compensated pump, a first three-way valve, and a second three-way valve. The chiller is connected to the first flow path pump, the chiller and the first flow path pump are connected to the first three-way valve and the second three-way valve respectively, the first three-way valve is separately connected to the cooling core and the battery pack, and the second three-way valve is separately connected to the cooling core and the battery pack, to form a first coolant circulation loop and a second coolant circulation loop that are independent of each other.

The first coolant circulation loop includes the chiller, the first flow path pump, the first three-way valve, the cooling core, and the second three-way valve. The second coolant circulation loop includes the chiller, the first flow path pump, the first three-way valve, the battery pack, and the second three-way valve. In some possible implementations, the cooling subsystem may further include a first expansion water tank. The first expansion water tank is connected in series between the chiller and the second three-way valve.

The heating subsystem includes a condenser of the refrigeration cycle system, a second flow path pump, a heating core of the HVAC system, the battery pack, a second temperature compensated pump, a third three-way valve, and a fourth three-way valve. The condenser is connected to the second flow path pump, the condenser and the second flow path pump are connected to the third three-way valve and the fourth three-way valve respectively, the third three-way valve is separately connected to the heating core and the battery pack, and the fourth three-way valve is separately connected to the heating core and the battery pack, to form a third coolant circulation loop and a fourth coolant circulation loop that are independent of each other. The third coolant circulation loop includes the condenser, the second flow path pump, the third three-way valve, the heating core, and the fourth three-way valve. The fourth coolant circulation loop includes the condenser, the second flow path pump, the third three-way valve, the battery pack, and the fourth three-way valve. In some possible implementations, the cooling subsystem may further include a second expansion water tank. The second expansion water tank is connected in series between the condenser and the fourth three-way valve.

In this embodiment of this application, within a time period, the refrigeration cycle system may cool the cooling core of the HVAC system and/or cool the battery pack by using the chiller, and the refrigeration cycle system may also heat the heating core of the HVAC system and/or heat the battery pack by using the condenser, to implement simultaneous cooling and heating.

In some possible implementations, the first three-way valve may be connected to a seventh three-way valve. The second three-way valve may be connected to an eighth three-way valve. The third three-way valve may be connected to the seventh three-way valve. The fourth three-way valve may be connected to the eighth three-way valve. Then, the seventh three-way valve and the eighth three-way valve may be connected to the battery pack. In this case, only one temperature compensated pump needs to be disposed, to reduce a quantity of components and implementation costs.

In some feasible embodiments, the two thermal management subsystems of the thermal management system each may further include a radiator. The cooling subsystem of the thermal management system includes a ninth three-way valve, a tenth three-way valve, and a first radiator. The ninth three-way valve is disposed between the first flow path pump and the first three-way valve. The tenth three-way valve is disposed between the first expansion water tank and the second three-way valve. Both the ninth three-way valve and the tenth three-way valve are connected to the first radiator. The heating subsystem of the thermal management system includes an eleventh three-way valve, a twelfth three-way valve, and a second radiator. The eleventh three-way valve is disposed between the second flow path pump and the third three-way valve. The twelfth three-way valve is disposed between the second expansion water tank and the fourth three-way valve. Both the eleventh three-way valve and the twelfth three-way valve are connected to the second radiator. In this case, the cooler and the condenser may separately use the respective radiators in a same time period.

In some feasible embodiments, the thermal management system may include only one radiator. The thermal management system further includes a fifth three-way valve and a sixth three-way valve. The fifth three-way valve is separately connected to the tenth three-way valve and the twelfth three-way valve. The sixth three-way valve is separately connected to the ninth three-way valve and the eleventh three-way valve. The fifth three-way valve and the sixth three-way valve are separately connected to the radiator. In this case, the chiller and the condenser may alternately use the radiator, so that only one radiator needs to be disposed for the foregoing cooling function, to reduce a quantity of components and implementation costs.

A third aspect of this application provides a new energy vehicle, including an electric motor and the thermal management system according to the first aspect. According to the new energy vehicle, the plurality of three-way valves of the thermal management system are separately controlled to control whether the first coolant circulation loop and/or the second coolant circulation loop are/is opened or control the flow rate of the coolant entering the first coolant circulation loop and/or the flow rate of the coolant entering the second coolant circulation loop, to separately control temperatures of the first thermal management object and the second thermal management object.

BRIEF DESCRIPTION OF DRAWINGS

FIG. 2-1 is a schematic diagram of an embodiment of a thermal management system according to this application;

FIG. 2-2 is a schematic diagram of another embodiment of a thermal management system according to this application;

FIG. 4-1 is a schematic diagram of another embodiment of a thermal management system according to this application;

FIG. 4-2 is a schematic diagram of another embodiment of a thermal management system according to this application;

FIG. 4-3 is a schematic diagram of another embodiment of a thermal management system according to this application;

FIG. 8-1 is a schematic diagram of another embodiment of a thermal management system according to this application;

FIG. 8-2 is a schematic diagram of another embodiment of a thermal management system according to this application;

FIG. 8-3 is a schematic diagram of another embodiment of a thermal management system according to this application;

FIG. 10-1 is a schematic diagram of an embodiment of a thermal management system according to this application;

FIG. 10-2 is a schematic diagram of another embodiment of a thermal management system according to this application;

FIG. 10-3 is a schematic diagram of another embodiment of a thermal management system according to this application;

FIG. 10-4 is a schematic diagram of another embodiment of a thermal management system according to this application.

DESCRIPTION OF EMBODIMENTS

Figure 1:
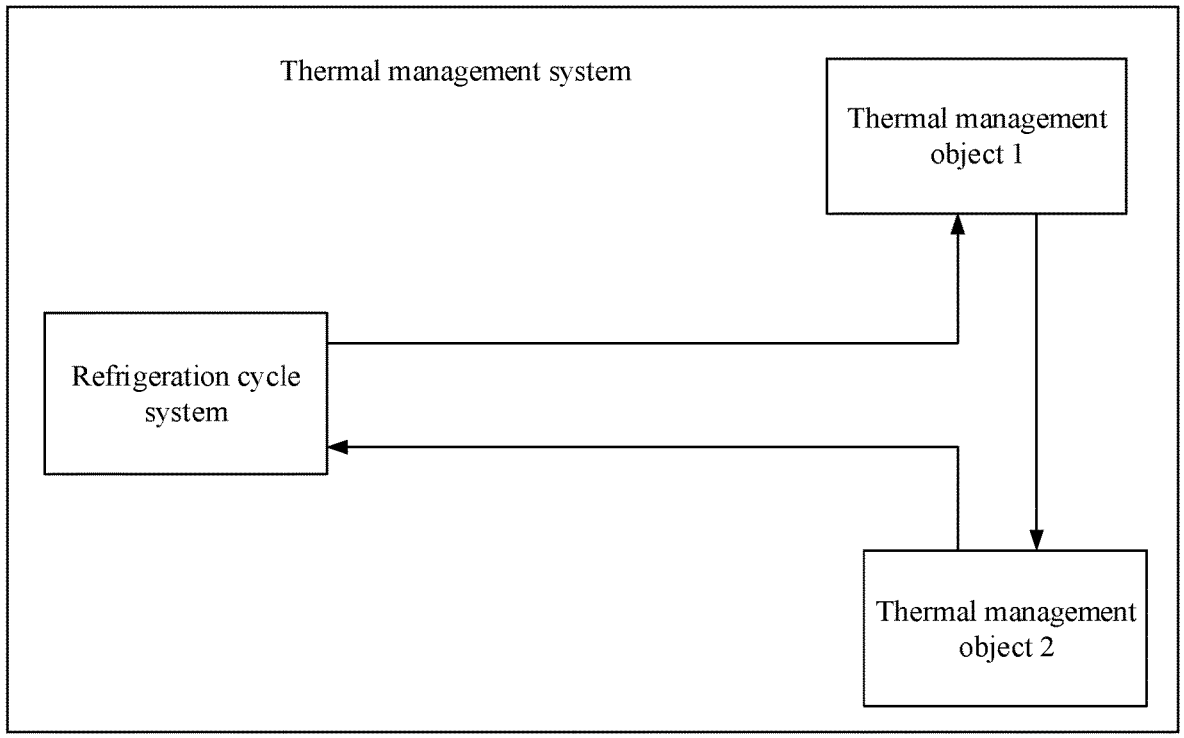
FIG. 1 is a schematic diagram of a current thermal management system.

Embodiments of this application provide a thermal management system and a new energy vehicle, to connect different thermal management objects in parallel and separately adjust temperatures.

An electric vehicle is mainly powered by a battery. Compared with fuel for a conventional vehicle, the battery has features such as energy conservation and environmental protection. For the electric vehicle, the battery is a core component. A plurality of batteries form a battery pack. Costs, performance, and a service life of the battery determine costs and reliability of the electric vehicle to a great extent. Therefore, any parameter that affects the battery needs to be optimized. A temperature and internal temperature uniformity of the battery greatly affect the performance and the service life. A high temperature accelerates a chemical reaction of the battery, causes permanent damage to the battery, and may further damage a substrate. This causes an overcharge phenomenon, and seriously affects the service life and performance of the battery. Research shows that a battery cycle count decreases by about 60% when the battery operates at an ambient temperature of 45° C. When the battery is charged at a high rate, the service life of the battery is halved if the temperature increases by 5° C. To sum up, an appropriate operating temperature is a prerequisite for good performance of the battery. Developing an effective thermal management system is of great significance to improve the overall performance of the battery.

In the thermal management system, the temperature of the battery is mainly controlled through heat exchange of air, liquid, or other phase change materials. The heat exchange of air is an early and commonly used temperature control manner. However, as battery energy becomes increasingly high, a requirement for a flow rate and a flow volume of air is increasingly high. This imposes a very high requirement on power of a fan, and generates huge noise. Therefore, the heat exchange of air gradually cannot meet a thermal management requirement of the battery. Some liquids, such as water, have a higher coefficient of thermal conductivity and a higher specific heat capacity than air. At a normal temperature, the thermal conductivity of water is dozens of times that of air, and the specific heat capacity of water is four times that of air. Therefore, it is generally considered that the heat exchange of liquid has better effect than the heat exchange of air, and can better meet the thermal management requirement of the battery. Therefore, the current heat exchange of liquid gradually replaces the heat exchange of air to become a mainstream heat exchange solution.

The heat exchange of liquid is also divided into direct heat exchange and indirect heat exchange. The direct heat exchange means that liquid with a high coefficient of thermal conductivity comes into direct contact with the battery and takes away heat. The liquid for the direct heat exchange generally has high viscosity and weak fluidity, such as Freon. The indirect heat exchange is performed by using at least two types of liquids. A temperature of one type of liquid is controlled by the other type of liquid, and the liquid with the temperature controlled comes into contact with the battery, to perform temperature control on the battery. The liquid with the temperature controlled is called a coolant. Common coolants include water, ethylene glycol, or a mixture thereof. The coolant has features of high fluidity and a high heat exchange coefficient. The indirect heat exchange is a heat exchange form with low production costs and high production efficiency in terms of time and process. Currently, thermal management of the battery is mainly implemented through the indirect heat exchange.

Currently, for the indirect heat exchange, the thermal management system may include a refrigeration cycle system and a plurality of thermal management objects. The thermal management system is configured to control a temperature of a coolant, and convey the coolant with the temperature controlled to the plurality of thermal management objects, to perform temperature control on the plurality of thermal management objects. Currently, the plurality of thermal management objects are connected in series relative to the refrigeration cycle system. Two thermal management objects are used as an example. As shown in FIG. 1, the thermal management system includes a refrigeration cycle system, a thermal management object 1, and a thermal management object 2. The refrigeration cycle system controls the temperature of the coolant and conveys the coolant with the temperature controlled to the thermal management object 1. The coolant flows through the thermal management object 1 and changes the temperature. The coolant continues to flow to the thermal management object 2, and finally returns to the refrigeration cycle system. In this case, because the coolant that passes through the thermal management object 1 is uncontrollable in temperature, temperature control of the thermal management object 2 cannot be accurately performed.

Therefore, this application provides a thermal management system, to connect different thermal management objects in parallel and separately adjust temperatures. The following provides descriptions separately by using two embodiments.

Embodiment 1

Figures 1, 2:
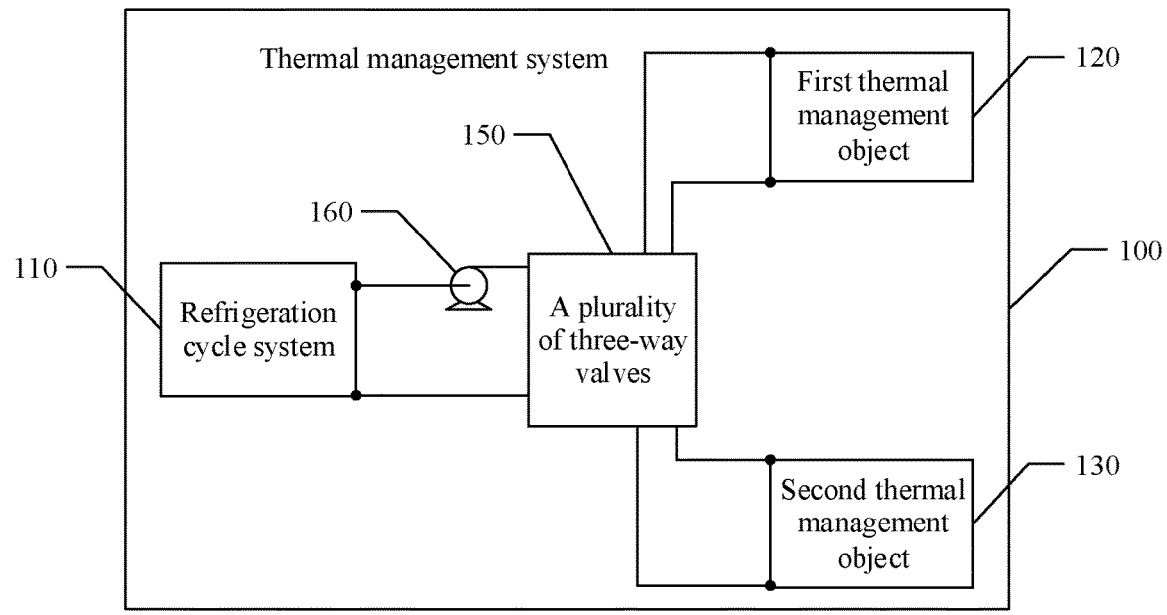
Figure 2:
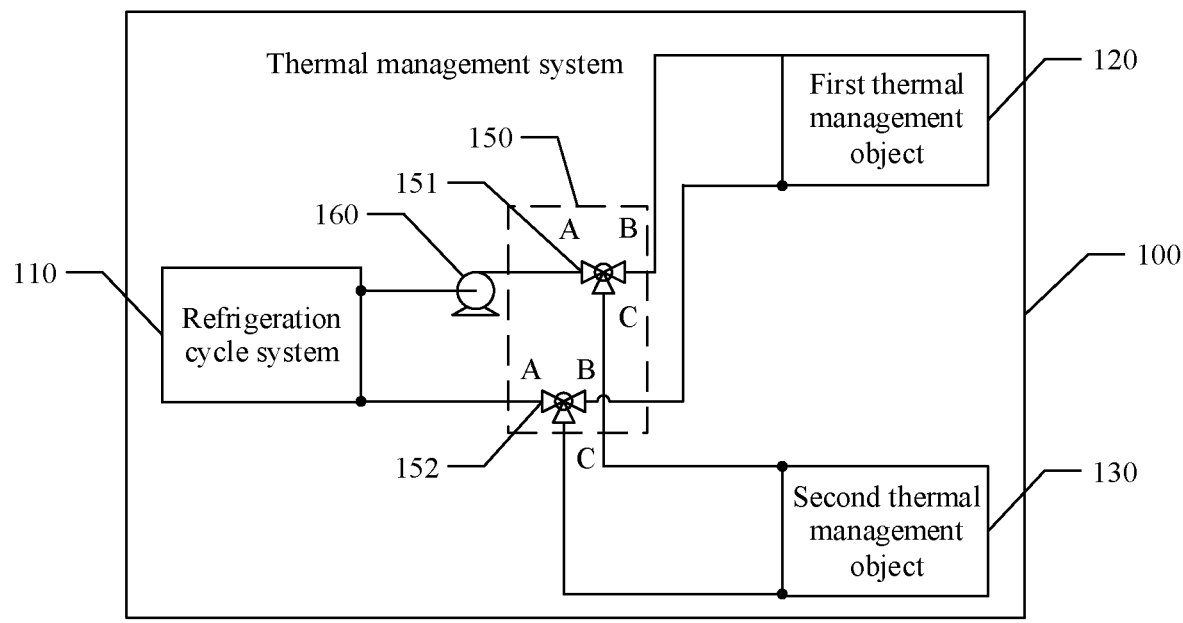

As shown in FIG. 2-1, an embodiment of this application provides a thermal management system 100. The thermal management system 100 includes a refrigeration cycle system 110, a flow path pump 160, a first thermal management object 120, a second thermal management object 130, and a plurality of three-way valves 150. The refrigeration cycle system 110 and the flow path pump 160 are separately connected to the plurality of three-way valves 150. The refrigeration cycle system 110 and the flow path pump 160 are connected to the first thermal management object 120 and the second thermal management object 130 through the plurality of three-way valves 150 respectively, to form a first coolant circulation loop and a second coolant circulation loop that are independent of each other.

The refrigeration cycle system 110 is configured to control a temperature of a coolant. The flow path pump 160 is configured to pressurize the coolant, so that the coolant flows in the first coolant circulation loop and/or the second coolant circulation loop. The plurality of three-way valves 150 are configured to control a flow direction and a flow rate of the coolant, to control whether the coolant flows in the first coolant circulation loop and/or the second coolant circulation loop, and control a flow rate.

In some possible implementations, the first coolant circulation loop and the second coolant circulation loop each include a common part of a circulation loop formed by the refrigeration cycle system 110, the flow path pump 160, and the plurality of three-way valves 150. The first coolant circulation loop further includes the first thermal management object 120. The second coolant circulation loop further includes the second thermal management object 130.

When the flow path pump 160 operates, the flow path pump 160 conveys the coolant with the temperature controlled in the refrigeration cycle system 110 to the plurality of three-way valves 150, so that the plurality of three-way valve 150 separately convey the coolant to the first thermal management object 120 and the second thermal management object 130 through the first coolant circulation loop and the second coolant circulation loop that are independent of each other, and the passing coolant exchanges heat with the first thermal management object 120 and the second thermal management object 130. The coolant returns to the refrigeration cycle system 110 through the plurality of three-way valves 150 after exchanging heat, to complete an entire flow path of the first coolant circulation loop and/or the second coolant circulation loop. In this embodiment of this application, the plurality of three-way valves 150 are separately controlled, for example, whether the valves are turned on/which valve is turned on/the flow rate of the coolant, to control whether the first coolant circulation loop and/or the second coolant circulation loop are/is opened or control a flow rate of a coolant entering the first coolant circulation loop and/or a flow rate of a coolant entering the second coolant circulation loop, to separately control temperatures of the first thermal management object 120 and the second thermal management object 130.

In some possible implementations, as shown in FIG. 2-2, the plurality of three-way valves 150 include a first three-way valve 151 and a second three-way valve 152. The refrigeration cycle system 110 is separately connected to the flow path pump 160 and the second three-way valve 152. The flow path pump 160 is connected to the first three-way valve 151.

It can be learned that the plurality of three-way valves each include three ports: a port A, a port B, and a port C. In this embodiment of this application, the refrigeration cycle system 110 is connected to the flow path pump 160. The flow path pump 160 is connected to the port A of the first three-way valve 151. The port B and the port C of the first three-way valve 151 are connected to the first thermal management object 120 and the second thermal management object 130 respectively. In addition, the first thermal management object 120 and the second thermal management object 130 are connected to the port B and the port C of the second three-way valve 152 respectively. The port A of the second three-way valve 152 is connected to the refrigeration cycle system 110. Therefore, the refrigeration cycle system 110, the flow path pump 160, the first three-way valve 151 (the port A and the port B), the first thermal management object 120, and the second three-way valve 152 (the port B and the port A) form the first coolant circulation loop. The refrigeration cycle system 110, the flow path pump 160, the first three-way valve 151 (the port A and the port C), the second thermal management object 130, and the second three-way valve 152 (the port C and the port A) form the second coolant circulation loop.

In this case, when the coolant is pressurized by the flow path pump 160 and flows to port A of the first three-way valve 151, the first three-way valve 151 separately conveys the coolant to the first thermal management object 120 and/or the second thermal management object 130 through the port B and the port C, so that the coolant performs temperature control on the first thermal management object 120 and/or the second thermal management object 130. The coolant separately flows back from the first thermal management object 120 and/or the second thermal management object 130 after exchanging heat, and flows to the port B and the port C of the second three-way valve 152. The coolant received by the port B and the port C of the second three-way valve 152 converges at the port A and returns to the refrigeration cycle system 110, to complete an entire flow path of the coolant in the first coolant circulation loop and/or the second coolant circulation loop.

In some possible implementations, when the refrigeration cycle system 110 performs temperature control on the first thermal management object 120 instead of the second thermal management object 130, the coolant may enter the first coolant circulation loop instead of the second coolant circulation loop. In other words, the port A and the port B of the first three-way valve 151 and the port A and the port B of the second three-way valve 152 are opened, and the port C of the first three-way valve 151 and the port C of the second three-way valve 152 are closed. When the refrigeration cycle system 110 performs temperature control on the second thermal management object 130 instead of the first thermal management object 120, the coolant may enter the second coolant circulation loop instead of the first coolant circulation loop. In other words, the port A and the port C of the first three-way valve 151 and the port A and the port C of the second three-way valve 152 are opened, and the port B of the first three-way valve 151 and the port B of the second three-way valve 152 are closed. When the refrigeration cycle system 110 performs temperature control on both the first thermal management object 120 and the second thermal management object 130, the coolant may simultaneously enter the first coolant circulation loop and the second coolant circulation loop. In other words, the port A, the port B, and the port C of the first three-way valve 151 and the port A, the port B, and the port C of the second three-way valve 152 are opened.

In conclusion, the first three-way valve 151 and the second three-way valve 152 may be controlled to control whether the first coolant circulation loop and/or the second coolant circulation loop are/is opened and control a flow rate of a coolant in the first coolant circulation loop and a flow rate of a coolant in the second coolant circulation loop, to separately control temperatures of the first thermal management object 120 and the second thermal management object 130.

Figure 3:
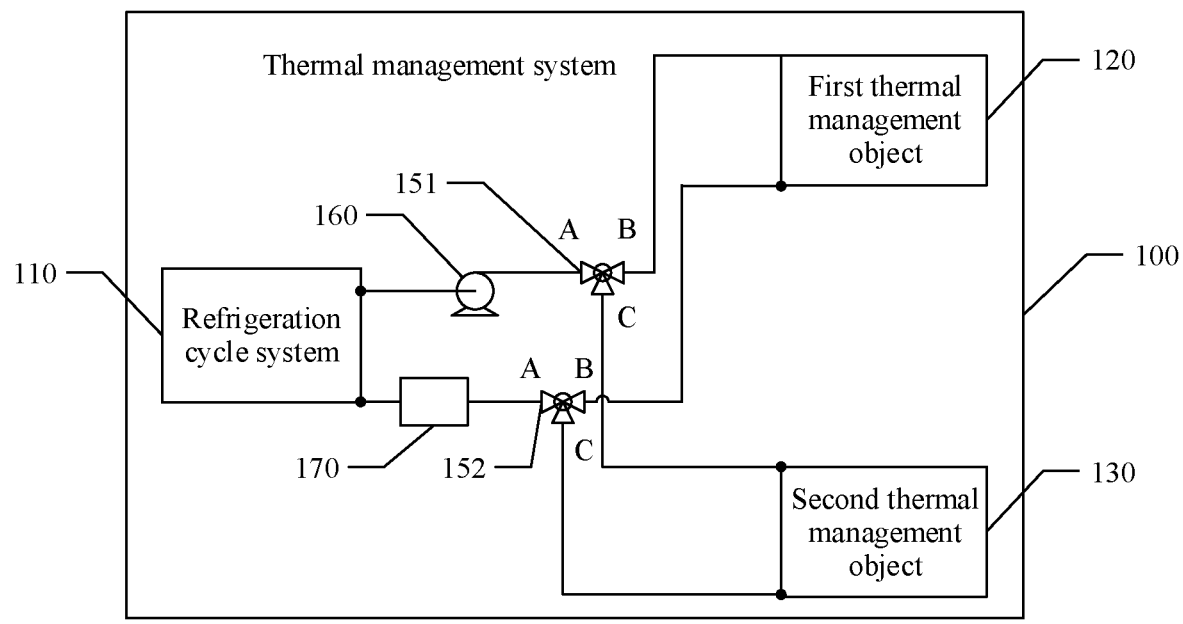
FIG. 3 is a schematic diagram of another embodiment of a thermal management system according to this application.

In some possible implementations, when a temperature of the coolant increases, due to thermal expansion and cold contraction, a total volume of the coolant increases, and a volume increase of the coolant may cause a hydraulic pressure increase or severely a pipe burst. As shown in FIG. 3, an expansion water tank 170 may be disposed in the thermal management system 100, to accommodate the volume increase of the coolant and keep the thermal management system 100 properly operating. The expansion water tank 170 is connected in series between the refrigeration cycle system 110 and the second three-way valve 152, and is configured to accommodate the volume increase of the coolant caused by thermal expansion.

In some possible implementations, the thermal management object may be an HVAC system, a battery pack, an electric motor, and the like. In this embodiment of this application, an example in which the first thermal management object 120 is an HVAC system 120 and the second thermal management object 130 is a battery pack 130 is used for description.

It should be noted that the HVAC system 120 is generally disposed in a cabin. Because the cabin is a space in which a driver is located, a pleasant temperature of generally 16° C. to 28° C. is required. In this case, temperature control of the HVAC system 120 needs to be adjusted with a change of an outdoor temperature. For example, heating is required in winter, cooling is required in summer, cooling is required in the daytime, and heating is required at night. The battery pack 130 has an optimal operating temperature range of 20° C. to 45° C. An excessively high or excessively low temperature adversely affects performance and a service life of a battery. A temperature of the battery pack 130 is closely related to a working condition. For example, when an electric vehicle is running, the battery pack needs to be cooled. When the electric vehicle stops, the battery pack 130 needs to be heated. A case in which the HVAC system 120 needs to be heated or cooled is not related to a case in which the battery pack 130 needs to be heated or cooled, resulting in inconsistent temperature requirements of the HVAC system 120 and the battery pack 130. In this embodiment of this application, temperatures of the first coolant circulation loop and the second coolant circulation loop are separately controlled, to meet different temperature requirements of the HVAC system 120 and the battery pack 130.

In the thermal management system 100, although the flow rate of the coolant in the first coolant circulation loop and the flow rate of the coolant in the second coolant circulation loop may be separately controlled, the coolant in the first coolant circulation loop and the coolant the second coolant circulation loop have a same temperature, resulting in inflexible temperature control of the HVAC system 120 and the battery pack 130.

Figures 1, 4:
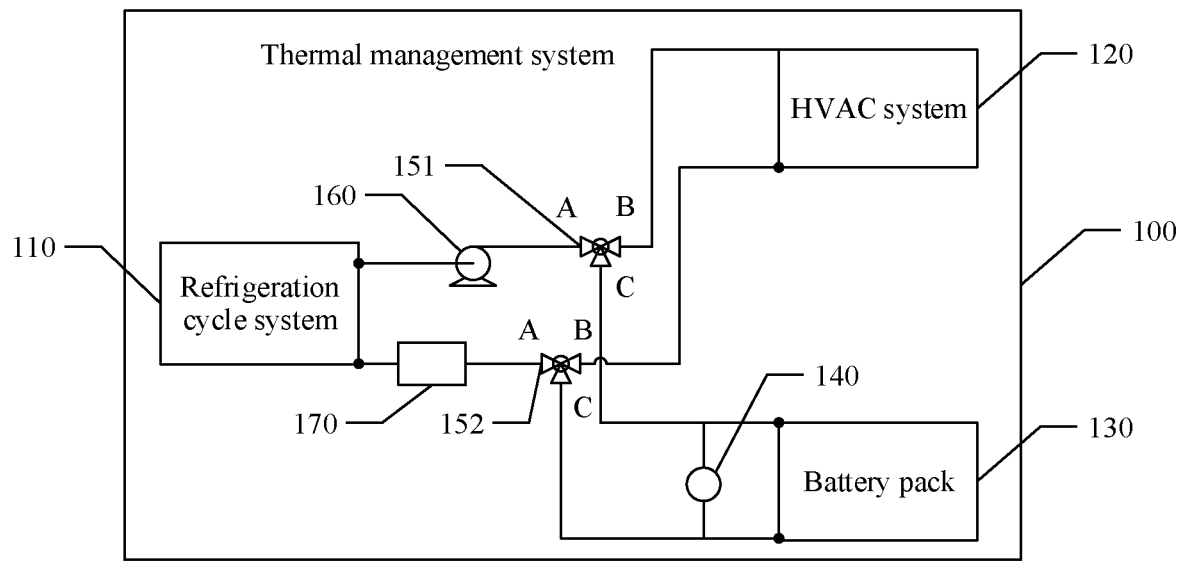
Figures 2, 4:
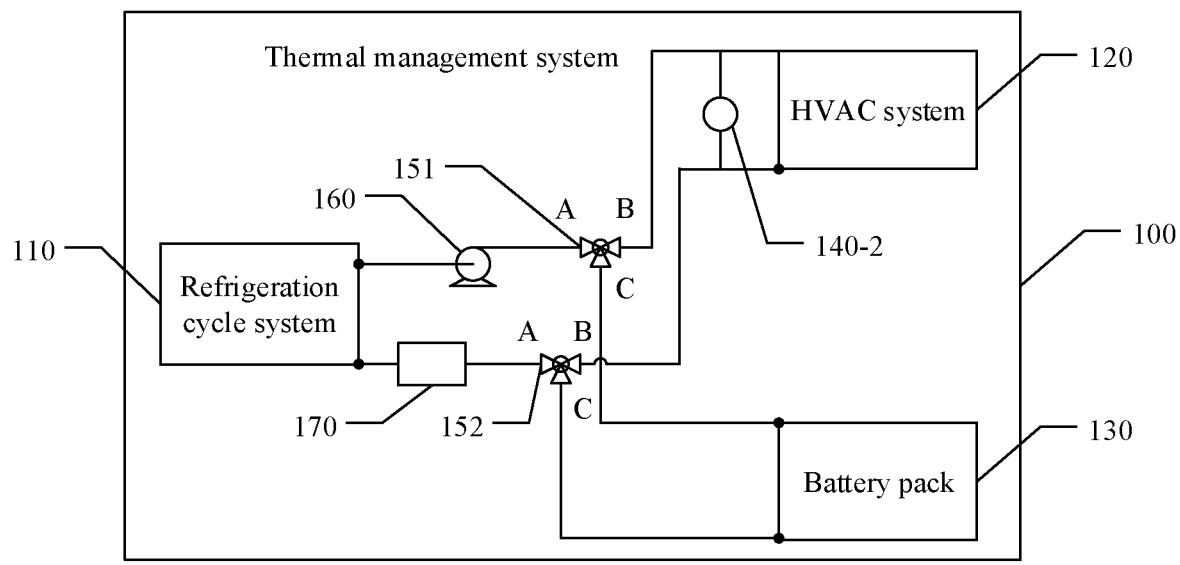
Figures 3, 4:
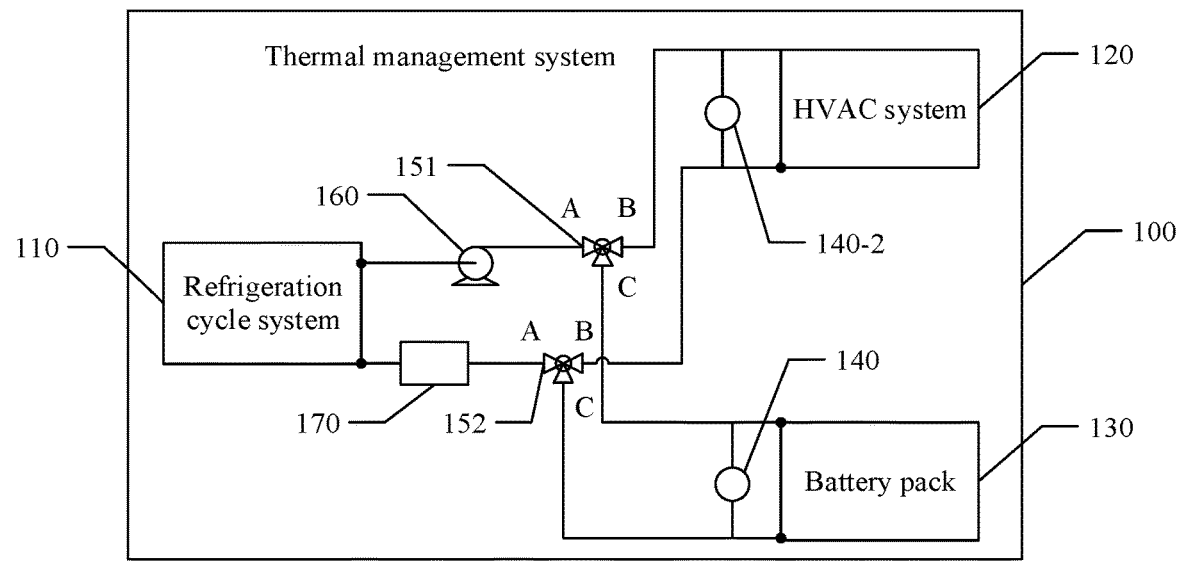

Therefore, in some possible implementations, as shown in FIG. 4-1, the thermal management system 100 further includes a temperature compensated pump 140. The temperature compensated pump 140 is connected to a coolant output and a coolant input of the battery pack 130, and is configured to guide a coolant from an output part of the battery pack 130 back into and then input the coolant to the battery pack 130, to implement compensation control of a cooling temperature of the battery pack 130 and form a third coolant circulation loop from the temperature compensated pump 140 to the battery pack 130 to adjust a temperature of the coolant flowing to the battery pack 130. Therefore, a temperature of the coolant received by the battery pack 130 is different from a temperature of the coolant received by the HVAC system 120, and temperature control of the HVAC system 120 and battery pack 130 based on different temperature requirements is improved.

After the coolant separately flows through the HVAC system 120 and the battery pack 130, the coolant changes the temperature through heat exchange. It should be noted that the refrigeration cycle system 110 may be used for cooling or heating. Cooling is used as an example herein.

The battery pack 130 requires a higher temperature and the HVAC system 120 requires a lower temperature. However, when the coolant enters the HVAC system 120 and the battery pack 130 through the first coolant circulation loop and the second coolant circulation loop respectively, the coolant entering the HVAC system 120 and the coolant entering the battery pack 130 have a same temperature. After the coolant separately exchanges heat with the HVAC system 120 and the battery pack 130, a temperature of the returning coolant increases. In this case, the temperature compensated pump 140 obtains the coolant with the temperature increased, and mixes the coolant with a coolant from the first three-way valve 151 through the third coolant circulation loop to form a new coolant. The new coolant flows into the battery pack 130, so that a temperature of the coolant flowing into the battery pack 130 is higher than a temperature of the coolant flowing into the HVAC system 120, to meet a higher temperature requirement of the battery pack 130.

In some possible implementations, as shown in FIG. 4-2, a second temperature compensated pump 140-2 may alternatively be disposed to be connected to a coolant output and a coolant input of the HVAC system 120, and is configured to guide a coolant from an output part of the HVAC system 120 back into the HVAC system 120, to implement compensation control of a cooling temperature of the HVAC system 120 and form a coolant circulation loop from the second temperature compensated pump 140-2 to the HVAC system 120 to adjust a temperature of the coolant flowing to the HVAC system 120. Therefore, a temperature of the coolant received by the battery pack 130 is different from a temperature of the coolant received by the HVAC system 120, to further meet different temperature requirements of the HVAC system 120 and battery pack 130.

Heating is used as an example. After the coolant separately flows through the HVAC system 120 and the battery pack 130, the coolant changes the temperature through heat exchange. The battery pack 130 requires a higher temperature and the HVAC system 120 requires a lower temperature. However, when the coolant enters the HVAC system 120 and the battery pack 130 through the first coolant circulation loop and the second coolant circulation loop respectively, after the coolant separately exchanges heat with the HVAC system 120 and the battery pack 130, a temperature of the returning coolant decreases. In this case, the temperature compensated pump 140 obtains the coolant with the temperature decreased, and mixes the coolant with a coolant from the first three-way valve 151 through a coolant circulation loop from the second temperature compensated pump 140-2 to the HVAC system 120 to form a new coolant. The new coolant flows into the HVAC system 120, so that a temperature of the coolant flowing into the HVAC system 120 is lower than a temperature of the coolant flowing into the battery pack 130, to meet a lower temperature requirement of the HVAC system 120.

In some possible implementations, as shown in FIG. 4-3, the temperature compensated pump 140 may be disposed to be connected to a coolant output and a coolant input of the battery pack 130, and the second temperature compensated pump 140-2 may also be disposed to be connected to a coolant output and a coolant input of the HVAC system 120. In this case, regardless of whether the coolant is used for cooling or heating, regardless of a higher or lower temperature requirement of the HVAC system 120 and the battery pack 130, temperatures of the HVAC system 120 and the battery pack 130 may be separately controlled by using the second temperature compensated pump 140-2 and the temperature compensated pump 140, to more flexibly meet different temperature requirements of the HVAC system 120 and the battery pack 130.

For brevity of description, in the following description of this embodiment of this application, only an example in which the temperature compensated pump 140 is disposed for the battery pack 130 is used for description.

Figure 5:
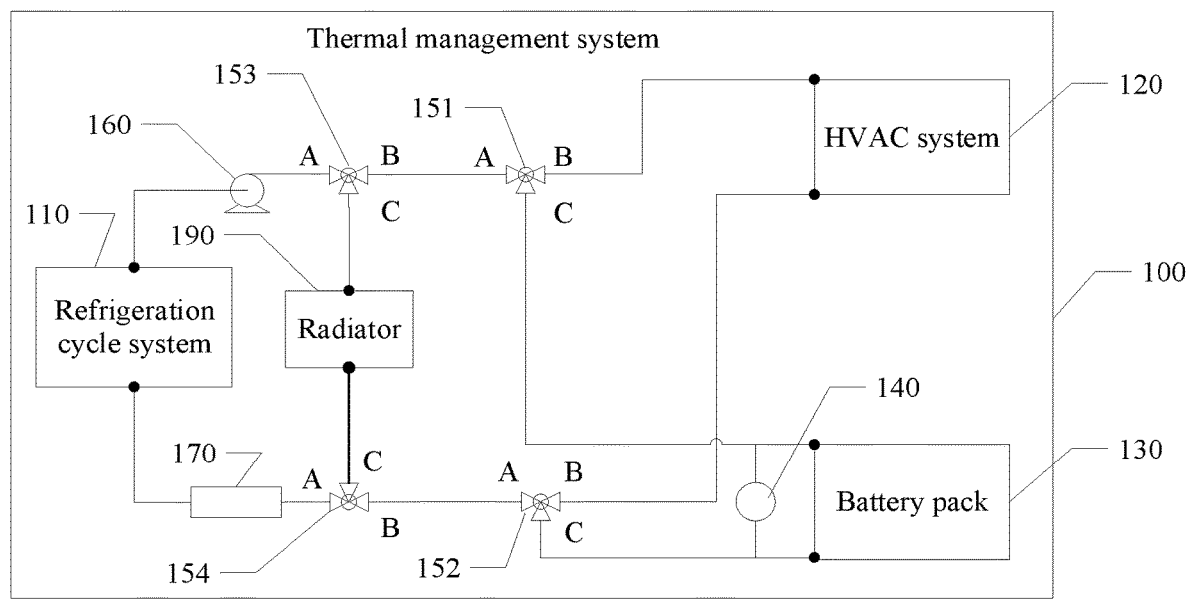
FIG. 5 is a schematic diagram of another embodiment of a thermal management system according to this application.

In some possible implementations, as shown in FIG. 5, the thermal management system 100 further includes a radiator 190. The plurality of three-way valves 150 further include a third three-way valve 153 and a fourth three-way valve 154. The third three-way valve 153 is connected in series between the flow path pump 160 and the first three-way valve 151, the fourth three-way valve 154 is connected in series between the flow path pump 160 and the second three-way valve 152, and the radiator 190 is separately connected to the third three-way valve 153 and the fourth three-way valve 154, to allow the refrigeration cycle system 110, the flow path pump 160, the third three-way valve 153 (the port A and the port C), the radiator 190, and the fourth three-way valve 154 (the port A and the port C) to form a fourth coolant circulation loop. The radiator 190 is configured to allow the refrigeration cycle system 110 to exchange heat with an external environment, to remove redundant heat in the refrigeration cycle system 110.

Figure 6:
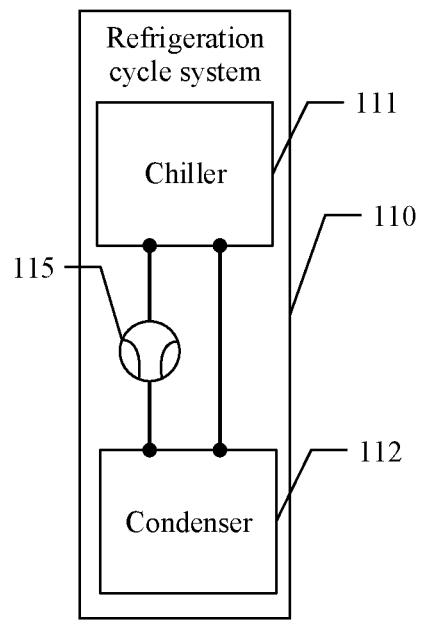
FIG. 6 is a schematic diagram of an embodiment of a refrigeration cycle system of a thermal management system according to this application.

In some possible implementations, as shown in FIG. 6, the refrigeration cycle system 110 includes a chiller 111, a condenser 112, and a compressor 115. The condenser 112 is separately connected to the compressor 115 and the chiller 111, and the compressor 115 is connected to the chiller 111, to form a refrigerant circulation loop of the condenser 112, the compressor 115, and the chiller 111.

It should be noted that the compressor 115 is a driven fluid machine that compresses low-pressure gas to high-pressure gas, and may be referred to as a heart of the refrigeration cycle system 110. The compressor 115 sucks in a low-temperature and low-pressure gas refrigerant, compresses the gas refrigerant by using a piston driven by a running electric motor, exhausts a high-temperature and high-pressure gas refrigerant to an exhaust pipe, to provide power for the refrigerant in the refrigerant circulation loop.

It should be noted that the refrigerant is also referred to as a coolant, and is a medium substance for energy conversion, for example, freon (a fluorine, chlorine, and bromine derivative of a saturated hydrocarbon), an azeotropic mixture working medium (an azeotropic solution formed by mixing two types of freon in a specific proportion), a hydrocarbon (propane, ethylene, and the like), and ammonia.

In this embodiment of this application, the condenser 112 first cools the refrigerant. The coolant obtains heat in a cooling process, and the heat is used for heating the coolant. When the compressor 115 operates, the condenser 112 conveys the cooled refrigerant to the chiller 111 through a pipe. Then, the chiller 111 cools the coolant by using the refrigerant, and the refrigerant obtains heat from the coolant. The refrigerant is vaporized after obtaining the heat. The chiller 111 conveys a vaporized refrigerant back to the condenser 112 through a pipe. Then, the condenser 112 cools the refrigerant. This cycle is repeated.

In conclusion, the refrigerant carries different quantities of heat in different forms, and circulates in the chiller 111 and the condenser 112, so that the chiller 111 performs cooling and the condenser 112 performs heating.

Figure 7:
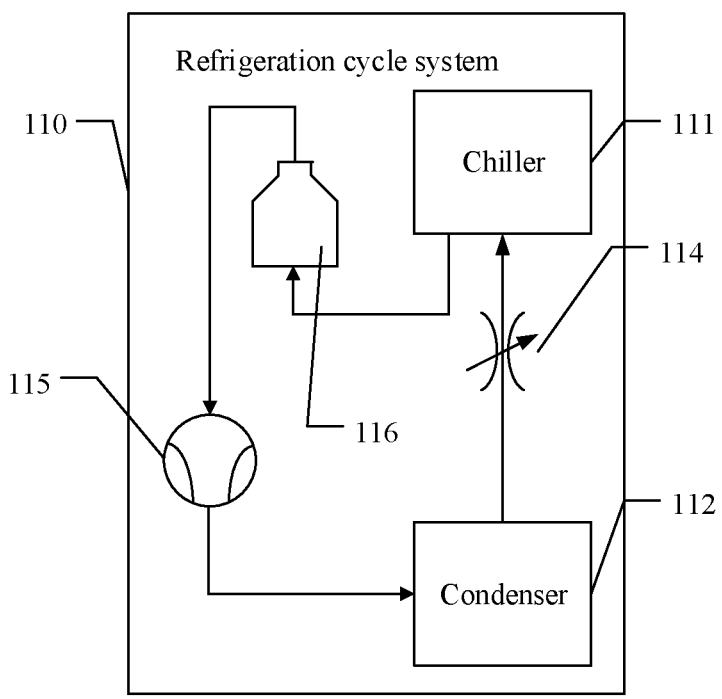
FIG. 7 is a schematic diagram of another embodiment of a refrigeration cycle system of a thermal management system according to this application.

In some possible implementations, as shown in FIG. 7, the refrigeration cycle system 110 further includes a throttling mechanism 114 and a liquid storage dryer 116. The throttling mechanism 114 is connected in series between the chiller 111 and the condenser 112, and is configured to control a flow rate of the liquid refrigerant from the condenser 112 to the chiller 111. The liquid storage dryer 116 is connected in series between the chiller 111 and the compressor 115, and is configured to dry and filter the gas refrigerant.

The throttling mechanism 114 is also referred to as a flow control mechanism, a throttling valve, or an expansion valve, and is configured to throttle saturated liquid (or supercooled liquid) under condensation pressure in the condenser, and after the throttling, performs depressurization to an evaporation pressure and an evaporation temperature, to implement cooling, and is further configured to adjust, based on a load change, a flow rate of the liquid entering the chiller 111, to adapt to the load change of the chiller 111.

The liquid storage dryer 116 stores liquid and absorbs water in the refrigeration cycle system 110, and also has auxiliary effect of filtering and auxiliary effect of being connected to air conditioner pipes. The liquid storage dryer is also referred to as a liquid storer, a liquid storage drier, a liquid storage tank, a liquid accommodation tank, a drying cylinder, a drying tank. In a cooling process, the refrigerant absorbs heat and releases heat through physical transformation. When added to a sealing system of an air conditioner, the refrigerant is inevitably mixed with moisture in the air and impurities in the pipes. During the physical transformation, water turns to solid ice and blocks the sealed pipes of the air conditioner, affecting flowing of the refrigerant and finally causing a refrigeration failure or severely a burst. The liquid storage dryer functions to absorb water in the sealed pipes of the air conditioner and also filter out small impurities in the pipes.

Figures 1, 8:
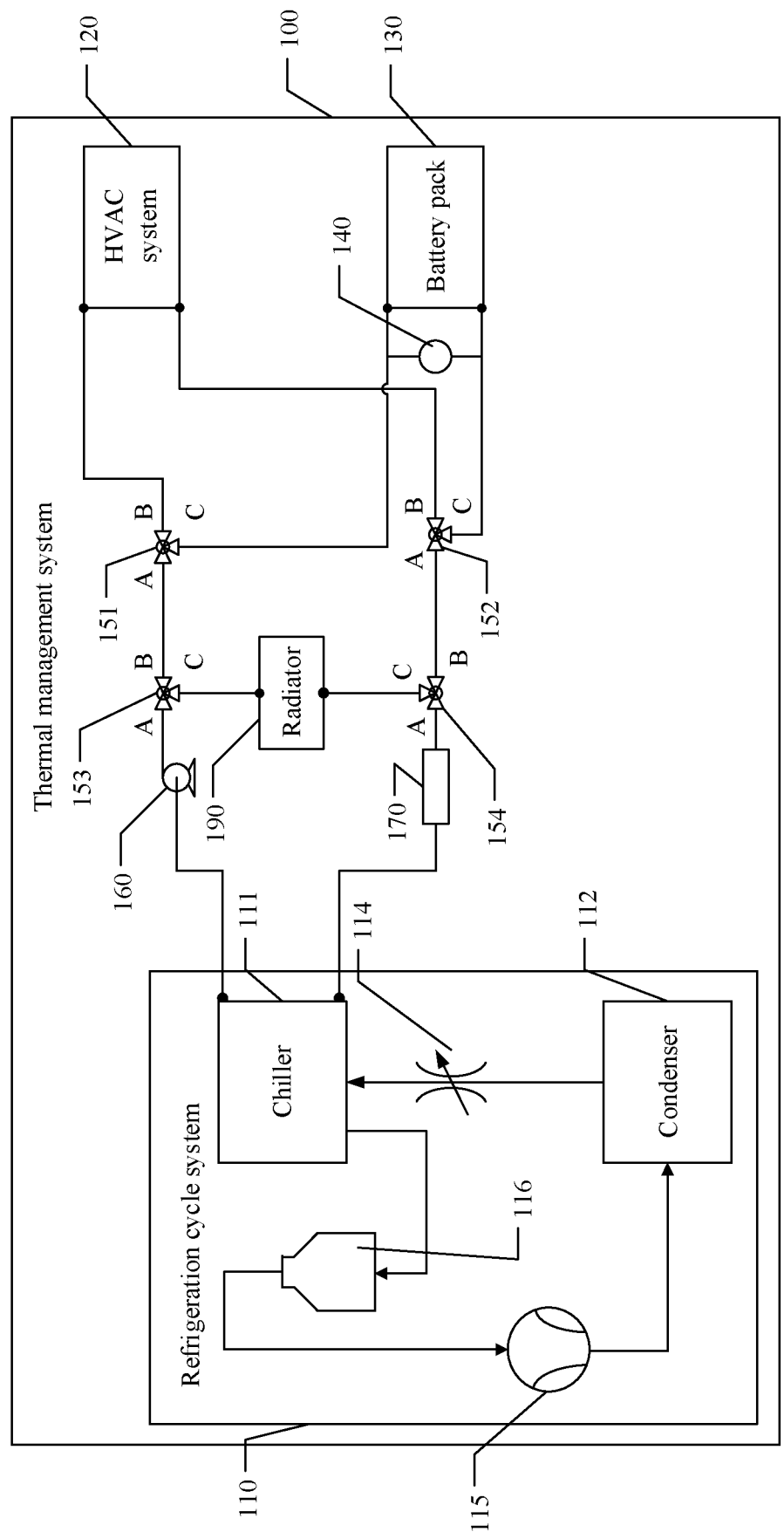
Figures 2, 8:
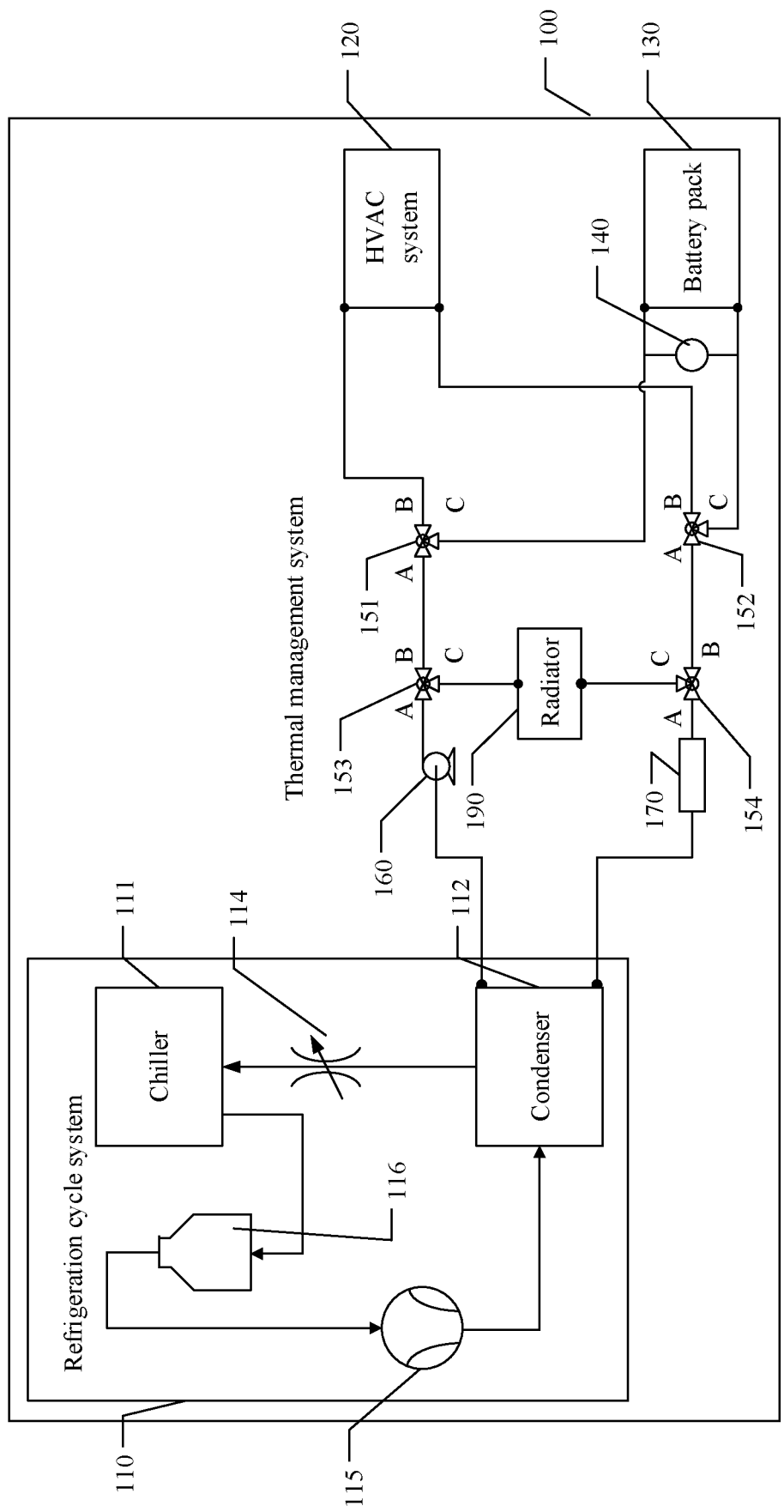
Figures 3, 8:
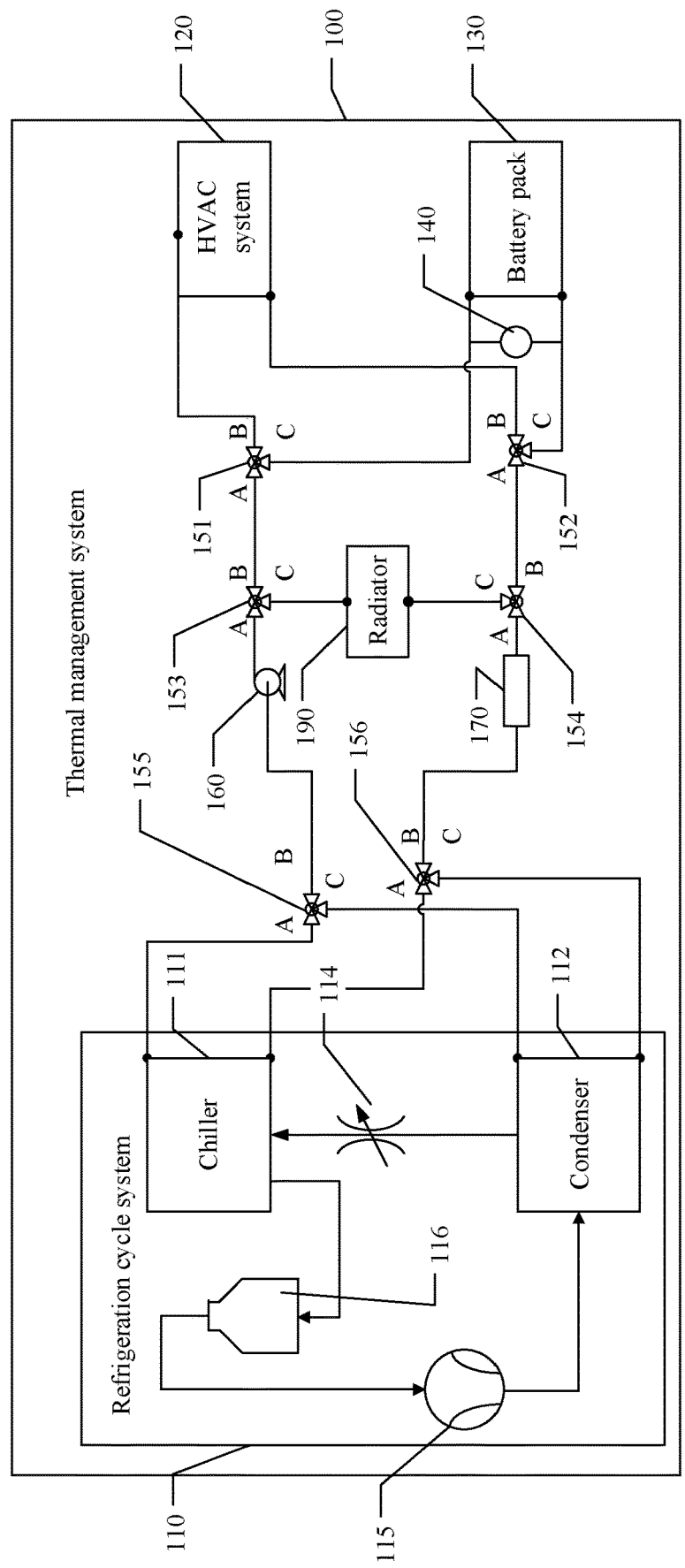

In some possible implementations, as shown in FIG. 8-1, the chiller 111 of the refrigeration cycle system 110 and the flow path pump 160 are connected to the first thermal management object 120 and the second thermal management object 130 through the plurality of three-way valve 150 respectively, so that the chiller 111 cools the first thermal management object 120 and the second thermal management object 130, and the thermal management system 100 has a cooling function.

In some possible implementations, as shown in FIG. 8-2, the condenser 112 of the refrigeration cycle system 110 and the flow path pump 160 are connected to the first thermal management object 120 and the second thermal management object 130 through the plurality of three-way valve 150 respectively, so that the condenser 112 heats the first thermal management object 120 and the second thermal management object 130, and the thermal management system 100 has a heating function.

In some possible implementations, as shown in FIG. 8-3, both the chiller 111 and the condenser 112 of the refrigeration cycle system 110 are connected to a fifth three-way valve 155 and a sixth three-way valve 156. In this case, both the chiller 111 and the condenser 112 of the refrigeration cycle system 110 are connected to the flow path pump 160 through the fifth three-way valve 155, and both the chiller 111 and the condenser 112 of the refrigeration cycle system 110 are connected to the expansion water tank 170 through the sixth three-way valve 156, so that the chiller 111/condenser 112 cools/heats the first thermal management object 120 and the second thermal management object 130, and the thermal management system 100 has a cooling/heating function. During cooling, a port A and a port B of the fifth three-way valve 155 and a port A and a port B of the sixth three-way valve 156 are opened, and ports C are closed. During heating, the port B and the port C of the fifth three-way valve 155 and the port B and the port C of the sixth three-way valve 156 are opened, and the ports A are closed. In this case, in a time period, the thermal management system 100 may perform cooling or heating.

Figure 9:
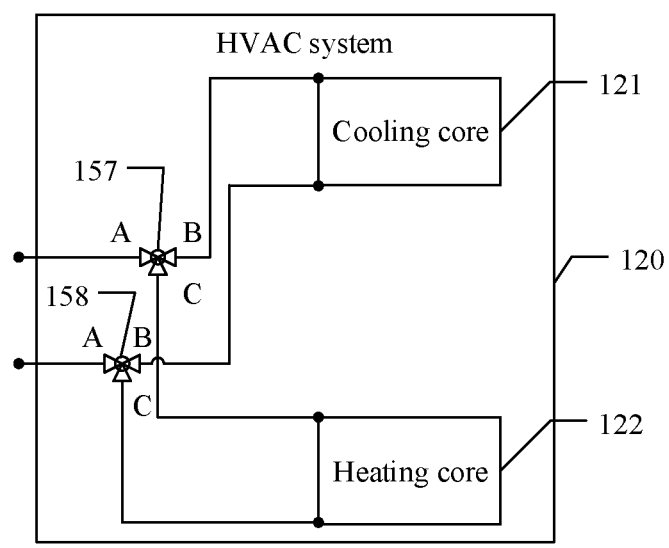
FIG. 9 is a schematic diagram of an embodiment of an HVAC system of a thermal management system according to this application.

In some possible implementations, as shown in FIG. 9, the HVAC system 120 includes a cooling core 121 and/or a heating core 122. The cooling core 121 is configured to receive the coolant from the chiller 111, and perform cooling by using the received coolant. The heating core 122 is configured to receive the coolant from the condenser 112, and perform heating by using the received coolant. It should be noted that, if the thermal management system 100 has a cooling function (as shown in FIG. 8-1), the HVAC system 120 includes a heating core; if the thermal management system 100 has a heating function (as shown in FIG. 8-2), the HVAC system 120 includes a cooling core; and if the thermal management system 100 has a cooling function and a heating function (as shown in FIG. 8-3), the HVAC system 120 includes a heating core and a cooling core.

As shown in FIG. 9, the HVAC system 120 may further include a seventh three-way valve 157 and an eighth three-way valve 158. A port A of the seventh three-way valve 157 is connected to the first three-way valve 151. A port A of the eighth three-way valve 158 is connected to the second three-way valve 152. A port B and a port C of the seventh three-way valve 157 are connected to the cooling core 121 and the heating core 122 respectively. A port B and a port C of the eighth three-way valve 158 are connected to the cooling core 121 and the heating core 122 respectively. In this case, during cooling, the port A and the port B of the seventh three-way valve 157 and the port A and the port B of the eighth three-way valve 158 are opened, and the port C of the seventh three-way valve 157 and the port C of the eighth three-way valve 158 are closed. During heating, the port A and the port C of the seventh three-way valve 157 and the port A and the port C of the eighth three-way valve 158 are opened, and the port B of the seventh three-way valve 157 and the port B of the eighth three-way valve 158 are closed.

The foregoing technical solution controls whether the first coolant circulation loop and/or the second coolant circulation loop are/is opened or controls the flow rate of the coolant entering the first coolant circulation loop and/or the flow rate of the coolant entering the second coolant circulation loop, to separately control temperatures of the first thermal management object and the second thermal management object.

In the foregoing description of Embodiment 1 of this application, the thermal management system can perform heating and/or cooling, but cannot perform simultaneous heating and cooling. In the following description of Embodiment 2, a thermal management system can perform simultaneous heating and cooling.

Embodiment 2

Figures 1, 10:
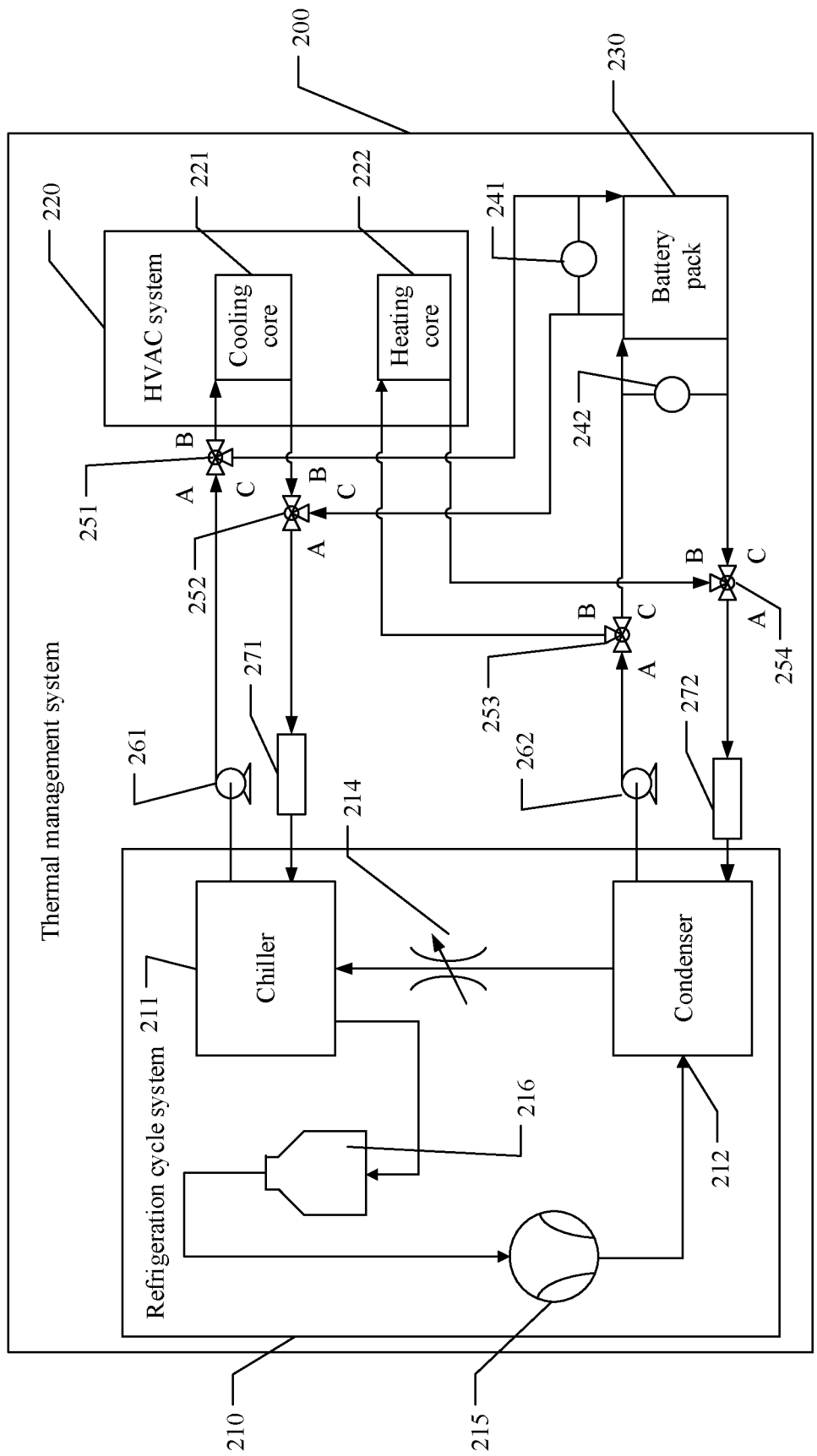
Figures 2, 10:
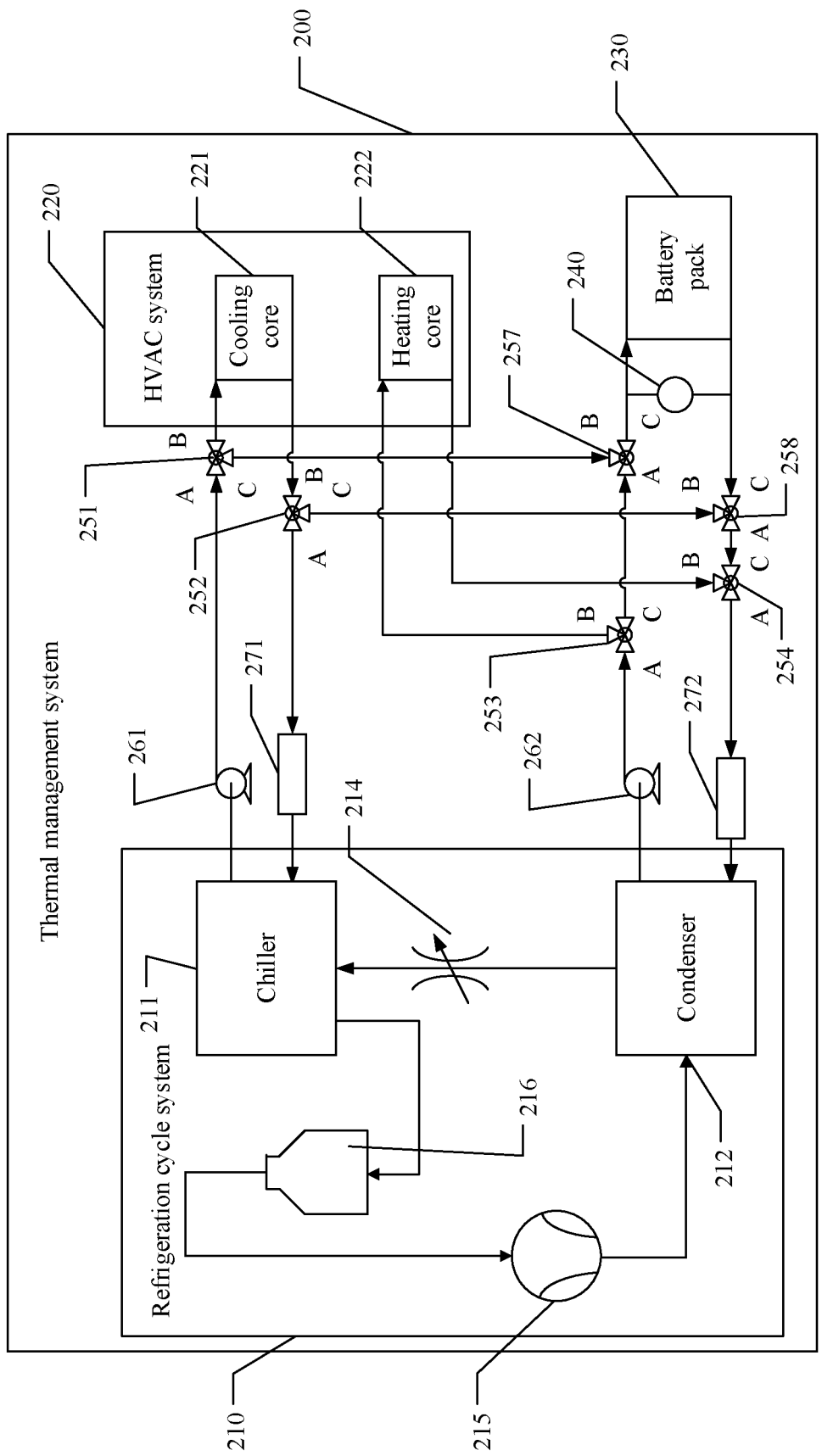
Figures 3, 10:
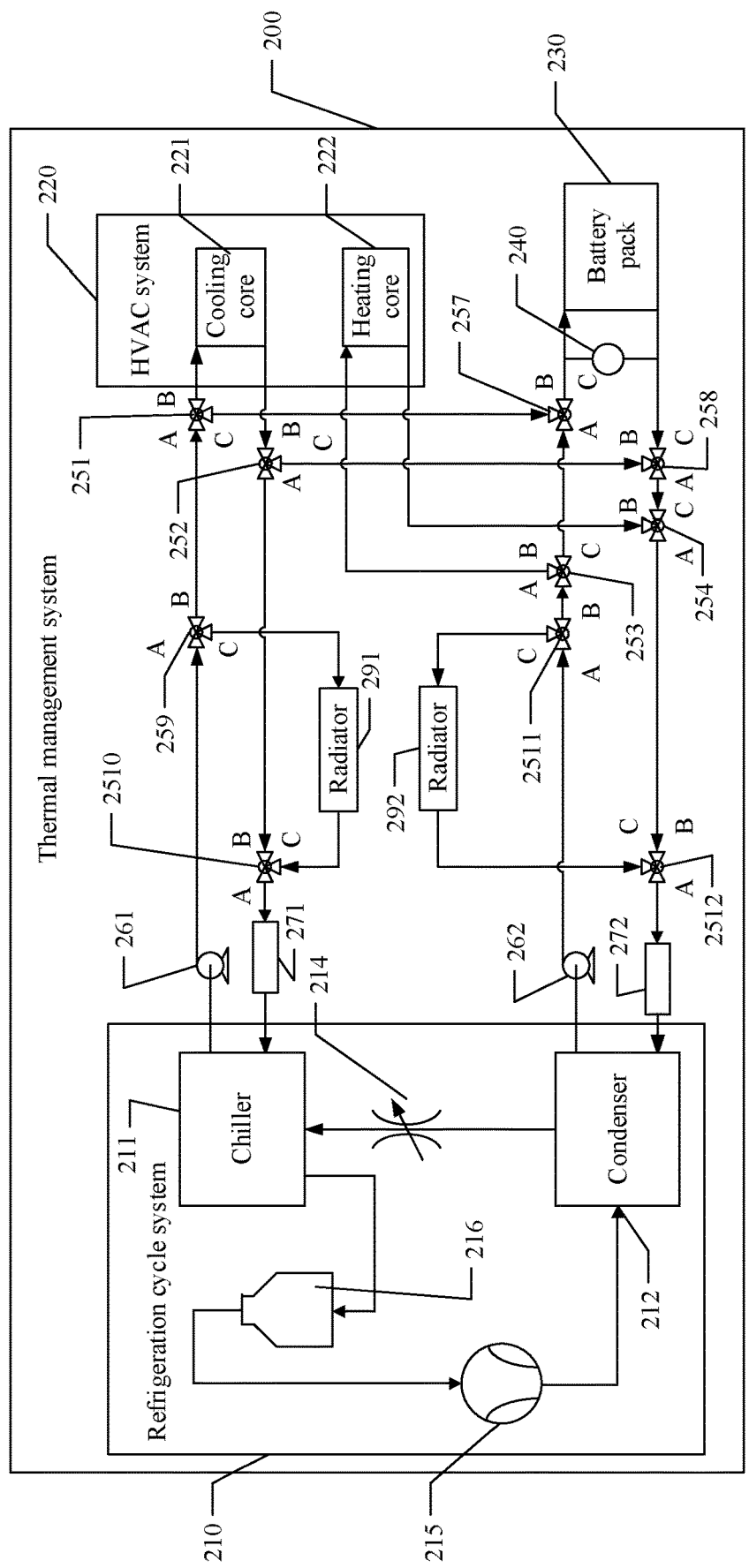
Figures 4, 10:
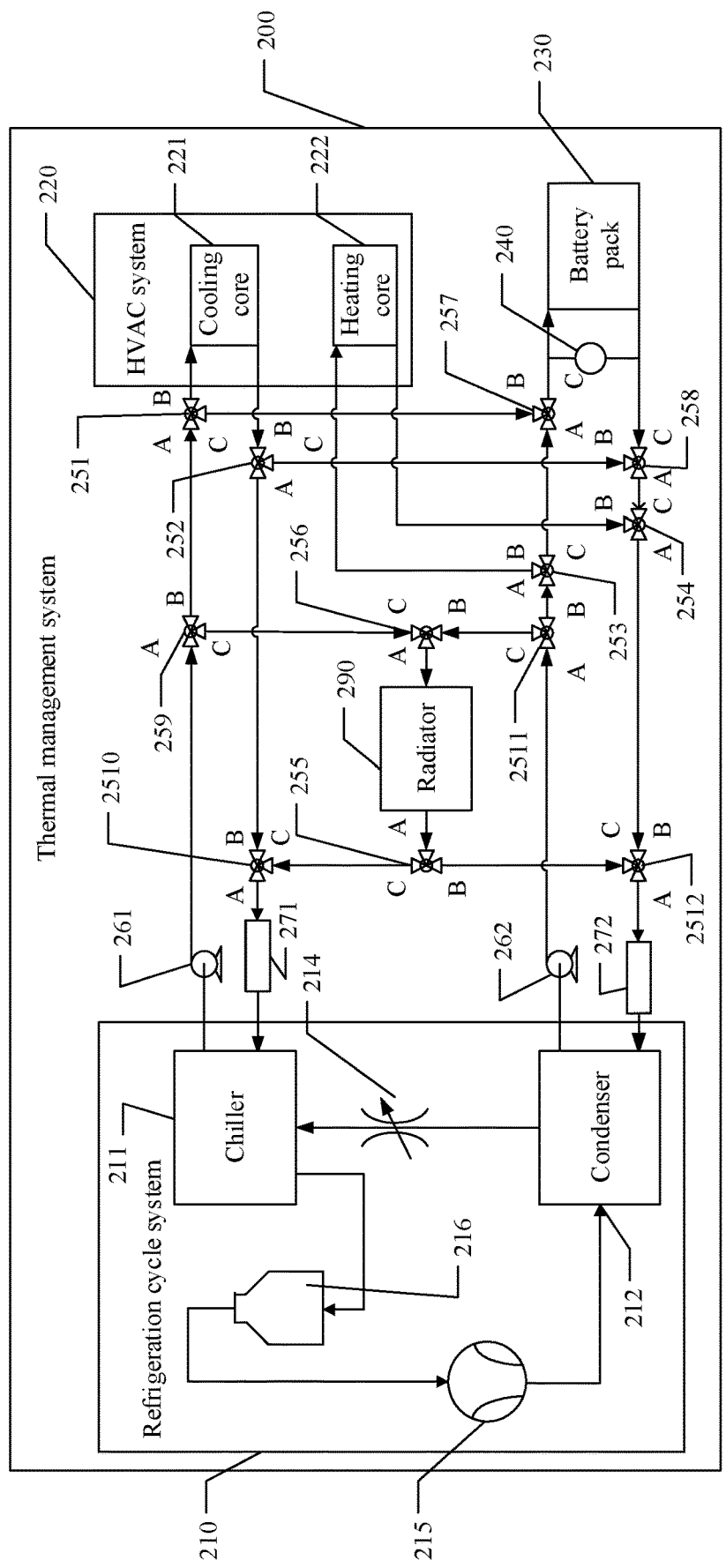

As shown in FIG. 10-1, an embodiment of this application further provides a thermal management system 200. The thermal management system 200 includes two thermal management subsystems: a cooling subsystem and a heating subsystem.

The cooling subsystem includes a chiller 211 of a refrigeration cycle system 210, a first flow path pump 261, a cooling core 221 of an HVAC system 220, a battery pack 230, a first temperature compensated pump 241, a first three-way valve 251, and a second three-way valve 252. The chiller 211 is connected to the first flow path pump 261, the chiller 211 and the first flow path pump 261 are connected to the first three-way valve 251 and the second three-way valve 252 respectively, the first three-way valve 251 is separately connected to the cooling core 221 and the battery pack 230, and the second three-way valve 252 is separately connected to the cooling core 221 and the battery pack 230, to form a first coolant circulation loop and a second coolant circulation loop that are independent of each other. The first coolant circulation loop includes the chiller 211, the first flow path pump 261, the first three-way valve 251, the cooling core 221, and the second three-way valve 252. The second coolant circulation loop includes the chiller 211, the first flow path pump 261, the first three-way valve 251, the battery pack 230, and the second three-way valve 252. In some possible implementations, the cooling subsystem may further include a first expansion water tank 271. The first expansion water tank 271 is connected in series between the chiller 211 and the second three-way valve 252. It should be noted that the foregoing components, the coolant circulation loop formed by the components, cooling principles, various implementations, and achievable technical effects are similar to those in Embodiment 1. Details are not described herein again.

The heating subsystem includes a condenser 212 of the refrigeration cycle system 210, a second flow path pump 262, a heating core 222 of the HVAC system 220, the battery pack 230, a second temperature compensated pump 242, a third three-way valve 253, and a fourth three-way valve 254. The condenser 212 is connected to the second flow path pump 262, the condenser 212 and the second flow path pump 262 are connected to the third three-way valve 253 and the fourth three-way valve 254 respectively, the third three-way valve 253 is separately connected to the heating core 222 and the battery pack 230, and the fourth three-way valve 254 is separately connected to the heating core 222 and the battery pack 230, to form a third coolant circulation loop and a fourth coolant circulation loop that are independent of each other. The third coolant circulation loop includes the condenser 212, the second flow path pump 262, the third three-way valve 253, the heating core 222, and the fourth three-way valve 254. The fourth coolant circulation loop includes the condenser 212, the second flow path pump 262, the third three-way valve 253, the battery pack 230, and the fourth three-way valve 254. In some possible implementations, the cooling subsystem may further include a second expansion water tank 272. The second expansion water tank 272 is connected in series between the condenser 212 and the fourth three-way valve 254. It should be noted that the foregoing components, the coolant circulation loop formed by the components, cooling principles, various implementations, and achievable technical effects are similar to those in Embodiment 1. Details are not described herein again.

In this embodiment of this application, within a time period, the refrigeration cycle system 210 may cool the cooling core 221 of the HVAC system 220 and/or cool the battery pack 230 by using the chiller 211, and the refrigeration cycle system 210 may also heat the heating core 222 of the HVAC system 220 and/or heat the battery pack 230 by using the condenser 212, to implement simultaneous cooling and heating.

Within a same time period, the functions may be implemented in the following four scenarios.

1. The function of cooling the cooling core 221 and cooling the battery pack 230 is implemented when a port A, a port B, and a port C of the first three-way valve 251 and a port A, a port B, and a port C of the second three-way valve 252 are opened, and a port A, a port B, and a port C of the third three-way valve 253 and a port A, a port B, and a port C of the fourth three-way valve 254 are closed.

2. The function of cooling the cooling core 221 and heating the battery pack 230 is implemented when a port A and a port B of the first three-way valve 251 and a port A and a port B of the second three-way valve 252 are opened while ports C are closed, and a port A and a port C of the third three-way valve 253 and a port A and a port C of the fourth three-way valve 254 are opened while ports B are closed.

3. The function of heating the cooling core 221 and cooling the battery pack 230 is implemented when a port A and a port B of the third three-way valve 253 and a port A and a port B of the fourth three-way valve 254 are opened while ports C are closed, and a port A and a port C of the first three-way valve 251 and a port A and a port C of the second three-way valve 252 are opened while ports B are closed.

4. The function of heating the cooling core 221 and heating the battery pack 230 is implemented when a port A, a port B, and a port C of the third three-way valve 253 and a port A, a port B, and a port C of the fourth three-way valve 254 are opened, and a port A, a port B, and a port C of the first three-way valve 251 and a port A, a port B, and a port C of the second three-way valve 252 are closed.

It should be noted that, in addition to the foregoing four functions, in the embodiment shown in FIG. 10-1, the function of simultaneously heating and cooling the HVAC system 220 may be further implemented (when the port A and the port B of the first three-way valve 251 and the port A and the port B of the second three-way valve 252 are opened, and the port A and the port B of the third three-way valve 253 and the port A and the port B of the fourth three-way valve 254 are opened, and the function of simultaneously heating and cooling the battery pack 230 may also be implemented (when the port A and the port C of the first three-way valve 251 and the port A and the port C of the second three-way valve 252 are opened, and the port A and the port C of the third three-way valve 253 and the port A and the port C of the fourth three-way valve 254 are opened). However, this is a waste of energy. In a specific implementation scenario, simultaneous heating and cooling do not need to be performed on one thermal management object.

Therefore, in some feasible embodiments, as shown in FIG. 10-2, the battery pack 230 does not need to be connected to two pairs of pipes. Instead, the port C of the first three-way valve 251 may be connected to a port B of a seventh three-way valve 257, the port C of the second three-way valve 252 is connected to a port B of an eighth three-way valve 258, the port C of the third three-way valve 253 is connected to a port A of the seventh three-way valve 257, the port C of the fourth three-way valve 254 is connected to a port A of the eighth three-way valve 258, and then a port C of the seventh three-way valve 257 and a port C of the eighth three-way valve 258 are connected to the battery pack 230. In this case, only one temperature compensated pump 240 needs to be disposed for the foregoing four required functions, to reduce a quantity of components and implementation costs.

In some feasible embodiments, the two thermal management subsystems of the thermal management system 200 each may further include a radiator. As shown in FIG. 10-3, the cooling subsystem of the thermal management system 200 includes a ninth three-way valve 259, a tenth three-way valve 2510, and a first radiator 291. The ninth three-way valve 259 is disposed between the first flow path pump 261 and the first three-way valve 251. The tenth three-way valve 2510 is disposed between the first expansion water tank 271 and the second three-way valve 252. Both the ninth three-way valve 259 and the tenth three-way valve 2510 are connected to the first radiator 291. The heating subsystem of the thermal management system 200 includes an eleventh three-way valve 2511, a twelfth three-way valve 2512, and a second radiator 292. The eleventh three-way valve 2511 is disposed between the second flow path pump 262 and the third three-way valve 253. The twelfth three-way valve 2512 is disposed between the second expansion water tank 272 and the fourth three-way valve 254. Both the eleventh three-way valve 2511 and the twelfth three-way valve 2512 are connected to the second radiator 292. In this case, the chiller 211 and the condenser 212 may separately use the respective radiators in a same time period.

In some feasible embodiments, the thermal management system 200 may include only one radiator 290.

As shown in FIG. 10-4, the cooling subsystem of the thermal management system 200 includes a ninth three-way valve 259 and a tenth three-way valve 2510. The heating subsystem of the thermal management system 200 includes an eleventh three-way valve 2511 and a twelfth three-way valve 2512. The ninth three-way valve 259, the tenth three-way valve 2510, the eleventh three-way valve 2511, and the twelfth three-way valve 2512 has same locations as those in FIG. 10-3.

The thermal management system 200 further includes a fifth three-way valve 255 and a sixth three-way valve 256. A port C and a port B of the fifth three-way valve 255 are connected to the tenth three-way valve 2510 and the twelfth three-way valve 2512 respectively. A port C and a port B of the sixth three-way valve 256 are connected to the ninth three-way valve 259 and the eleventh three-way valve 2511 respectively. A port A of the fifth three-way valve 255 and a port A of the sixth three-way valve 256 are separately connected to the radiator 290. In this case, the chiller 211 and the condenser 212 may alternately use the radiator 290, so that only one radiator 290 needs to be disposed for the foregoing cooling function, to reduce a quantity of components and implementation costs.

Figure 11:
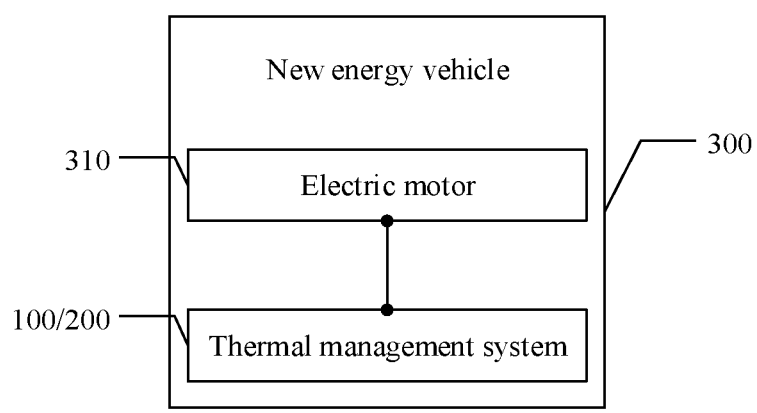
FIG. 11 is a schematic diagram of an embodiment of a new energy vehicle according to this application.

Based on a same technical concept, as shown in FIG. 11, an embodiment of this application further provides a new energy vehicle 300. The new energy vehicle 300 includes an electric motor 310 and the foregoing thermal management system 100/200.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A thermal management system, comprising:
a refrigeration cycle system, a flow path pump, a first thermal management object, a second thermal management object, and a plurality of three-way valves, and wherein the first thermal management object is a heating, ventilation and air conditioning (HVAC) system, and the second thermal management object is a battery pack, wherein
the refrigeration cycle system and the flow path pump are connected to the plurality of three-way valves; and
the refrigeration cycle system and the flow path pump are connected to the first thermal management object and the second thermal management object through the plurality of three-way valves respectively, to form a first coolant circulation loop and a second coolant circulation loop that are independent of each other.

2. The thermal management system according to claim 1, wherein
the thermal management system further comprises:
a temperature compensated pump, wherein
the temperature compensated pump is connected to a coolant output and a coolant input of the battery pack, and is configured to guide a coolant from an output part of the battery pack back into the battery pack, to implement compensation control of a cooling temperature of the battery pack and form a third coolant circulation loop from the temperature compensated pump to the battery pack.

3. The thermal management system according to claim 1, wherein
the first coolant circulation loop and the second coolant circulation loop each comprises a common part of a circulation loop formed by the refrigeration cycle system, the flow path pump, and the plurality of three-way valves, the first coolant circulation loop further comprises the first thermal management object, and the second coolant circulation loop further comprises the second thermal management object.

4. The thermal management system according to claim 1, wherein
the plurality of three-way valves comprise a first three-way valve and a second three-way valve; and
the refrigeration cycle system and the flow path pump are connected to the plurality of three-way valves:

the refrigeration cycle system is connected to the flow path pump and the second three-way valve, and the flow path pump is connected to the first three-way valve.

5. The thermal management system according to claim 4, wherein
the refrigeration cycle system and the flow path pump are connected to the first thermal management object and the second thermal management object through the plurality of three-way valves respectively, to form the first coolant circulation loop and the second coolant circulation loop that are independent of each other:
the flow path pump is connected to the first thermal management object and the second thermal management object through the first three-way valve, to allow the refrigeration cycle system, the flow path pump, the first three-way valve, the first thermal management object, and the second three-way valve to form the first coolant circulation loop; and
the refrigeration cycle system is connected to the first thermal management object and the second thermal management object through the second three-way valve, to allow the refrigeration cycle system, the flow path pump, the first three-way valve, the second thermal management object, and the second three-way valve to form the second coolant circulation loop.

6. The thermal management system according to claim 4, further comprising:
a radiator, wherein the plurality of three-way valves further comprise a third three-way valve and a fourth three-way valve; and
the third three-way valve is connected in series between the flow path pump and the first three-way valve, the fourth three-way valve is connected in series between the flow path pump and the second three-way valve, and the radiator is connected to the third three-way valve and the fourth three-way valve, to allow the refrigeration cycle system, the flow path pump, the third three-way valve, the radiator, and the fourth three-way valve to form a fourth coolant circulation loop.

7. The thermal management system according to claim 4, further comprising:
an expansion water tank, wherein the expansion water tank is connected in series between the refrigeration cycle system and the second three-way valve, and is configured to accommodate a volume increase of a coolant caused by thermal expansion.

8. The thermal management system according to claim 1, wherein the refrigeration cycle system comprises a chiller, a condenser, and a compressor;
the condenser is connected to the compressor and the chiller, and the compressor is connected to the chiller;
the compressor is configured to obtain a gas refrigerant from the chiller, and convey the gas refrigerant to the condenser;
the condenser is configured to cool the gas refrigerant to convert the gas refrigerant into a liquid refrigerant and obtain heat, heat a coolant by using the obtained heat, and convey the liquid refrigerant to the chiller under pressure provided by the compressor; and
the chiller is configured to cool the coolant by using the liquid refrigerant, to convert the liquid refrigerant into a gas refrigerant.

9. The thermal management system according to claim 8, wherein the refrigeration cycle system further comprises:
a throttling mechanism and a liquid storage dryer;
the throttling mechanism is connected in series between the chiller and the condenser, and is configured to control a flow rate of the liquid refrigerant from the condenser to the chiller; and
the liquid storage dryer is connected in series between the chiller and the compressor, and is configured to dry and filter the gas refrigerant.

10. The thermal management system according to claim 8, wherein
the first thermal management object comprises a cooling core and a heating core;
the cooling core is configured to receive the coolant from the chiller, and perform cooling by using the received coolant; and
the heating core is configured to receive the coolant from the condenser, and perform heating by using the received coolant.

11. A new energy vehicle, comprising an electric motor and a thermal management system, wherein the thermal management system comprises:
a refrigeration cycle system, a flow path pump, a first thermal management object, a second thermal management object, and a plurality of three-way valves, wherein
the refrigeration cycle system and the flow path pump are connected to the plurality of three-way valves; and
the refrigeration cycle system and the flow path pump are connected to the first thermal management object and the second thermal management object through the plurality of three-way valves respectively, to form a first coolant circulation loop and a second coolant circulation loop that are independent of each other, wherein the first thermal management object is a heating, ventilation and air conditioning (HVAC) system, and the second thermal management object is a battery pack.

12. The new energy vehicle according to claim 11, wherein
the thermal management system further comprises:
a temperature compensated pump, wherein
the temperature compensated pump is connected to a coolant output and a coolant input of the battery pack, and is configured to guide a coolant from an output part of the battery pack back into the battery pack, to implement compensation control of a cooling temperature of the battery pack and form a third coolant circulation loop from the temperature compensated pump to the battery pack.

13. The new energy vehicle according to claim 11, wherein
the first coolant circulation loop and the second coolant circulation loop each comprises a common part of a circulation loop formed by the refrigeration cycle system, the flow path pump, and the plurality of three-way valves, the first coolant circulation loop further comprises the first thermal management object, and the second coolant circulation loop further comprises the second thermal management object.

14. The new energy vehicle according to claim 11, wherein
the plurality of three-way valves comprise a first three-way valve and a second three-way valve; and
the refrigeration cycle system and the flow path pump are connected to the plurality of three-way valves:

the refrigeration cycle system is connected to the flow path pump and the second three-way valve, and the flow path pump is connected to the first three-way valve.

15. The new energy vehicle according to claim 14, wherein
the refrigeration cycle system and the flow path pump are connected to the first thermal management object and the second thermal management object through the plurality of three-way valves respectively, to form the first coolant circulation loop and the second coolant circulation loop that are independent of each other:
the flow path pump is connected to the first thermal management object and the second thermal management object through the first three-way valve, to allow the refrigeration cycle system, the flow path pump, the first three-way valve, the first thermal management object, and the second three-way valve to form the first coolant circulation loop; and
the refrigeration cycle system is connected to the first thermal management object and the second thermal management object through the second three-way valve, to allow the refrigeration cycle system, the flow path pump, the first three-way valve, the second thermal management object, and the second three-way valve to form the second coolant circulation loop.

16. The new energy vehicle according to claim 14, wherein the thermal management system further comprises:
a radiator, wherein the plurality of three-way valves further comprise a third three-way valve and a fourth three-way valve; and
the third three-way valve is connected in series between the flow path pump and the first three-way valve, the fourth three-way valve is connected in series between the flow path pump and the second three-way valve, and the radiator is connected to the third three-way valve and the fourth three-way valve, to allow the refrigeration cycle system, the flow path pump, the third three-way valve, the radiator, and the fourth three-way valve to form a fourth coolant circulation loop.

17. The new energy vehicle according to claim 14, wherein the thermal management system further comprises:
an expansion water tank, wherein the expansion water tank is connected in series between the refrigeration cycle system and the second three-way valve, and is configured to accommodate a volume increase of a coolant caused by thermal expansion.

18. The new energy vehicle according to claim 11, wherein the refrigeration cycle system comprises a chiller, a condenser, and a compressor;
the condenser is connected to the compressor and the chiller, and the compressor is connected to the chiller;
the compressor is configured to obtain a gas refrigerant from the chiller, and convey the gas refrigerant to the condenser;
the condenser is configured to cool the gas refrigerant to convert the gas refrigerant into a liquid refrigerant and obtain heat, heat a coolant by using the obtained heat, and convey the liquid refrigerant to the chiller under pressure provided by the compressor; and
the chiller is configured to cool the coolant by using the liquid refrigerant, to convert the liquid refrigerant into a gas refrigerant.

19. The new energy vehicle according to claim 18, wherein the refrigeration cycle system further comprises:
a throttling mechanism and a liquid storage dryer;
the throttling mechanism is connected in series between the chiller and the condenser, and is configured to control a flow rate of the liquid refrigerant from the condenser to the chiller; and
the liquid storage dryer is connected in series between the chiller and the compressor, and is configured to dry and filter the gas refrigerant.

20. The new energy vehicle according to claim 18, wherein
the first thermal management object comprises a cooling core and a heating core;
the cooling core is configured to receive the coolant from the chiller, and perform cooling by using the received coolant; and
the heating core is configured to receive the coolant from the condenser, and perform heating by using the received coolant.

* * * * *